US011041953B2

(12) United States Patent
Kato et al.

(10) Patent No.: US 11,041,953 B2
(45) Date of Patent: Jun. 22, 2021

(54) OBJECT DETECTING DEVICE AND SENSOR DEVICE

(71) Applicant: MITSUBISHI ELECTRIC CORPORATION, Tokyo (JP)

(72) Inventors: Yasunori Kato, Tokyo (JP); Ryuhei Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 468 days.

(21) Appl. No.: 16/065,653

(22) PCT Filed: Feb. 16, 2016

(86) PCT No.: PCT/JP2016/054463
§ 371 (c)(1),
(2) Date: Jun. 22, 2018

(87) PCT Pub. No.: WO2017/141352
PCT Pub. Date: Aug. 24, 2017

(65) Prior Publication Data
US 2019/0004175 A1 Jan. 3, 2019

(51) Int. Cl.
*G01C 3/08* (2006.01)
*G01S 17/00* (2020.01)
(Continued)

(52) U.S. Cl.
CPC ............ *G01S 17/003* (2013.01); *G01S 7/352* (2013.01); *G01S 7/4873* (2013.01);
(Continued)

(58) Field of Classification Search
CPC ...... G01S 17/26; G01S 17/003; G01S 7/4972; G01S 7/4873; G01S 7/352; G01S 13/86; G01S 13/345; G01S 13/87; G01S 13/34
(Continued)

(56) References Cited

U.S. PATENT DOCUMENTS 5,864,314 A  1/1999  Ashihara
6,317,073 B1  11/2001  Tamatsu et al.
(Continued)

FOREIGN PATENT DOCUMENTS

EP   1 760 488 A1   3/2007
JP   2012-68224 A   4/2012
JP   2014-109472 A  6/2014

OTHER PUBLICATIONS

Extended European Search Report issued in corresponding EP Application No. 16 890 494.4 dated Nov. 16, 2018.
(Continued)

*Primary Examiner* — Mark Hellner
(74) *Attorney, Agent, or Firm* — Birch, Stewart, Kolasch & Birch, LLP

(57) ABSTRACT

There are provided: a spectral analyzer configured to individually analyze a spectrum of a beat signal extracted by a beat signal extractor and a spectrum of a beat signal extracted by another object detecting device; a search range width setter configured to set a search range width for frequency; and a combination target selector configured to determine, for each spectrum analyzed by the spectral analyzer, a frequency search range having the search range width set by the search range width setter, and select, for each of the analyzed spectra, a frequency of a combination target from among the frequencies in the determined search range by comparing spectral components of the frequencies in the determined search range.

8 Claims, 11 Drawing Sheets

(51) Int. Cl.
  *G01S 13/34* (2006.01)
  *G01S 7/35* (2006.01)
  *G01S 13/86* (2006.01)
  *G01S 13/87* (2006.01)
  *G01S 13/58* (2006.01)
  *G01S 17/26* (2020.01)
  *G01S 7/487* (2006.01)
  *G01S 7/497* (2006.01)

(52) U.S. Cl.
  CPC ............ *G01S 7/4972* (2013.01); *G01S 13/34* (2013.01); *G01S 13/345* (2013.01); *G01S 13/583* (2013.01); *G01S 13/86* (2013.01); *G01S 13/87* (2013.01); *G01S 17/26* (2020.01)

(58) Field of Classification Search
  USPC ........................................................ 356/5.09
  See application file for complete search history.

(56) References Cited

U.S. PATENT DOCUMENTS

| | | | |
|---|---|---|---|
| 6,903,678 B2* | 6/2005 | Kumon | G01S 13/345 342/70 |
| 2014/0152502 A1 | 6/2014 | Nishikata et al. | |
| 2015/0378016 A1* | 12/2015 | Schoor | G01S 13/931 342/21 |

OTHER PUBLICATIONS

European Office Action for European Application No. 16890494.4, dated Jul. 8, 2019.
Yin et al., "Wideband Distributed Coherent Aperture Radar", 2014 IEEE Radar Conference, pp. 1114-1117, May 2014.

* cited by examiner

FIG. 10A
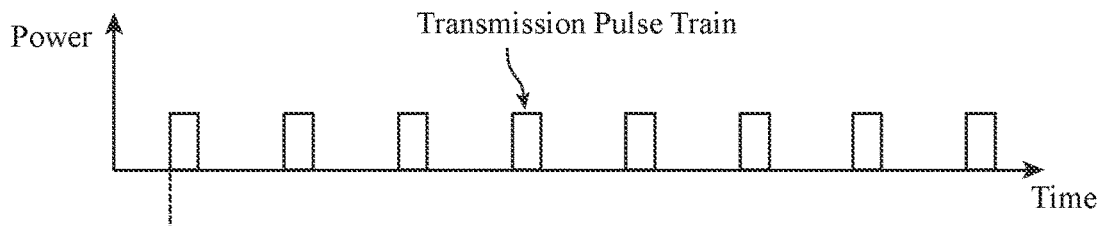
FIG. 10B
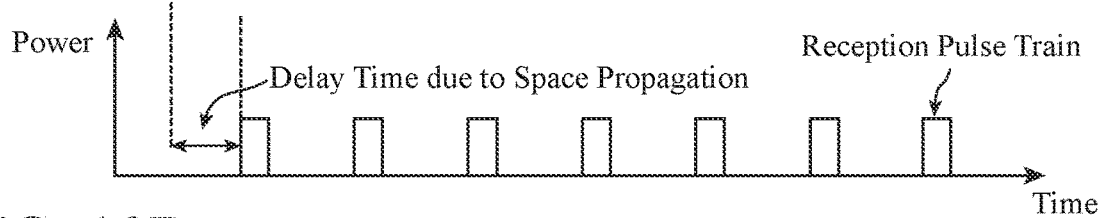
FIG. 10C
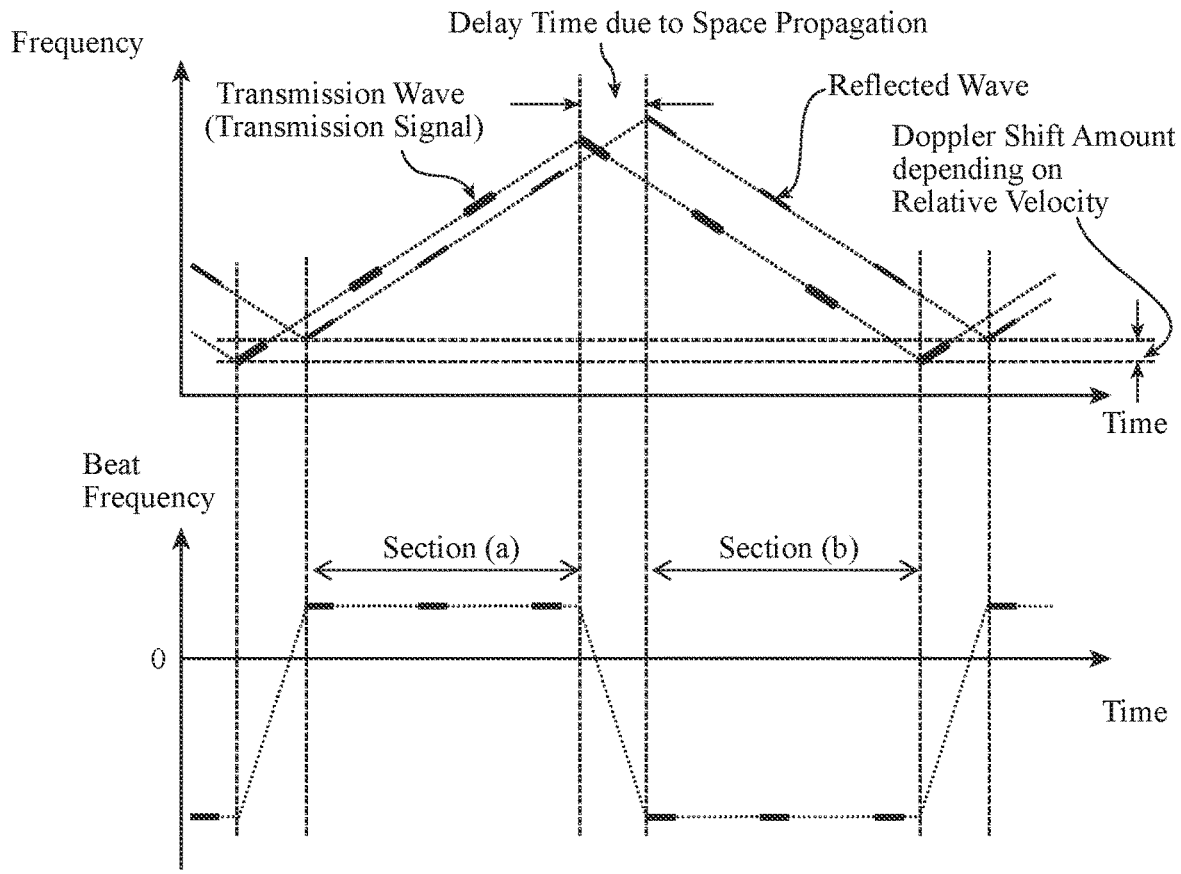
FIG. 10D

OBJECT DETECTING DEVICE AND SENSOR DEVICE

TECHNICAL FIELD

The present invention relates to an object detecting device for detecting an object existing in a space, and also relates to a sensor device mounting the object detecting device thereon.

BACKGROUND ART

The following method is known as a method for enhancing a detection probability by an object detecting device for detecting an object existing in a space.

A method is known as enhancing a detection probability of an object by receiving a signal reflecting off the object existing in the space with a plurality of object detecting devices, combining reception signals of the plurality of object detecting devices, and detecting the object from a combined signal, as compared with the case of detecting the object from a reception signal of a single object detecting device.

In the following non-patent literature 1, it is disclosed that a detection probability of an object to be detected is enhanced by acquiring position information of the object prior to combining reception signals of a plurality of object detecting devices, and performing coherent combining using the position information.

CITATION LIST

Non-Patent Literature 1: "Wideband Distributed Coherent Aperture Radar," 2014 IEEE Radar Conference, pp. 1114-1117, May 2014.

SUMMARY OF INVENTION

When combining the reception signals of the plurality of object detecting devices, the detection probability of the object may be enhanced by acquiring in advance the position information of the object to be detected and performing the coherent combining using the position information. However, there has been a problem that, in a case where the position information of the object to be detected cannot be acquired in advance, the detection probability of the object cannot be enhanced.

The present invention has been made to solve the above problem, and an object thereof is to provide an object detecting device that is capable of enhancing a detection probability of an object to be detected without acquiring position information of the object in advance.

In addition, another object of the present invention is to provide a sensor device on which the foregoing object detecting device is mounted.

An object detecting device according to the present invention is provided with: a beat signal extractor to receive a signal reflecting off an object to be detected and extract a beat signal from the received signal; a spectral analyzer to analyze a spectrum of the beat signal extracted by the beat signal extractor and a spectrum of a beat signal extracted by another object detecting device; a search range width setter to set a search range width for frequency; a combination target selector to determine, for each spectrum analyzed by the spectral analyzer, a frequency search range having the search range width set by the search range width setter, and select, for each of the analyzed spectra, a frequency of a combination target from among the frequencies in the determined search range by comparing spectral components of the frequencies in the determined search range; a frequency corrector to calculate individual frequency correcting amounts from differences between each of the frequencies of the combination targets selected by the combination target selector, and correct a frequency of the beat signal extracted by the beat signal extractor and a frequency of the beat signal extracted by said another object detecting device in accordance with each of the calculated frequency correcting amounts; a combiner to combine the beat signals, each of whose frequencies has been corrected by the frequency corrector; and an object detector to detect the object from a combined beat signal obtained by the combiner.

According to the present invention, there is provided: a beat signal extractor to receive a signal reflecting off an object to be detected and extract a beat signal from the received signal; a spectral analyzer to analyze a spectrum of the beat signal extracted by the beat signal extractor and a spectrum of a beat signal extracted by another object detecting device; a search range width setter to set a search range width for frequency; a combination target selector to determine, for each spectrum analyzed by the spectral analyzer, a frequency search range having the search range width set by the search range width setter, and select, for each of the analyzed spectra, a frequency of a combination target from among the frequencies in the determined search range by comparing spectral components of the frequencies in the determined search range; a frequency corrector to calculate individual frequency correcting amounts from differences between each of the frequencies of the combination targets selected by the combination target selector, and correct a frequency of the beat signal extracted by the beat signal extractor and a frequency of the beat signal extracted by said another object detecting device in accordance with each of the calculated frequency correcting amounts; and a combiner to combine the beat signals, each of whose frequencies has been corrected by the frequency corrector. Therefore, there is an effect that the detection probability of an object to be detected can be enhanced without acquiring the position information of the object in advance.

BRIEF DESCRIPTION OF DRAWINGS

FIG. 10A is an explanatory diagram illustrating a transmission signal including a plurality of pulses, FIG. 10B is an explanatory diagram illustrating a reception signal including a plurality of pulses, FIG. 10C is an explanatory diagram illustrating a transmission wave and a reflected wave whose frequencies change over time, and FIG. 10D is an explanatory diagram illustrating a beat signal whose beat frequency changes over time.

DESCRIPTION OF EMBODIMENTS

Hereinafter, in order to explain the present invention in more detail, embodiments for carrying out the present invention will be described with reference to the accompanying drawings.

Embodiment 1

Figure 1:
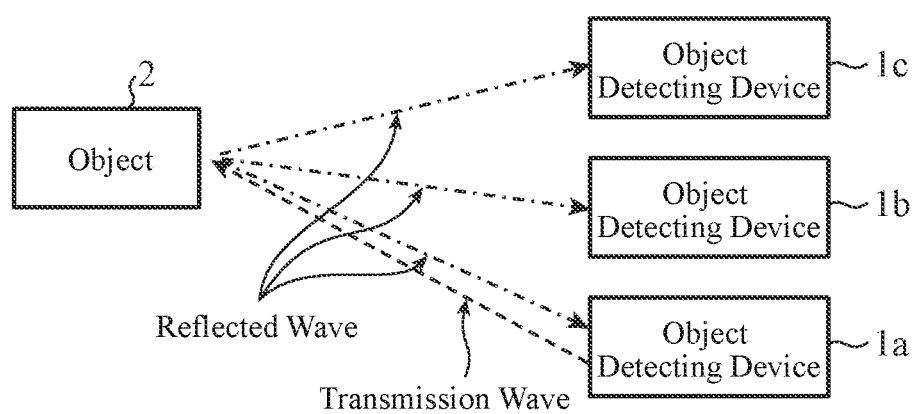
FIG. 1 is an explanatory diagram illustrating a relation between a plurality of object detecting devices and an object to be detected according to Embodiment 1 of the present invention.

FIG. 1 is an explanatory diagram illustrating a relation between a plurality of object detecting devices and an object to be detected according to Embodiment 1 of the present invention.

Although FIG. 1 illustrates an example using three object detecting devices 1a, 1b, and 1c, it is not limited to three as far as two or more object detecting devices are used.

In the example of FIG. 1, the object detecting device 1a radiates toward a space a transmission wave such as a radio frequency (RF) signal, and a reflected wave reflecting off and returning from an object 2 to be detected reaches the object detecting device 1a, the object detecting device 1b, and the object detecting device 1c.

In Embodiment 1, the object detecting devices 1a, 1b, and 1c may be expressed as an object detecting device 1 when it is not needed to distinguish those devices from each other.

Figure 2:
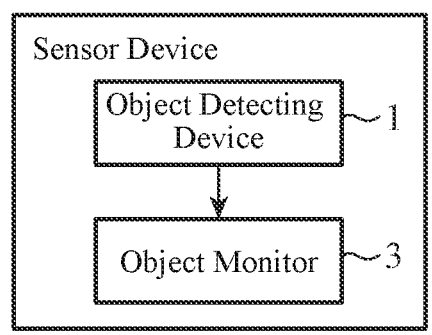
FIG. 2 is a structural diagram illustrating a sensor device according to Embodiment 1 of the present invention, on which an object detecting device is mounted.

FIG. 2 is a structural diagram illustrating a sensor device according to Embodiment 1 of the present invention, on which the object detecting device 1 is mounted.

In FIG. 2, an object monitor 3 is a processor for performing a process of monitoring the object 2 detected by the object detecting device 1.

A monitoring process for the object 2 performed by the object monitor 3 includes: a process of monitoring change in the position and velocity of the object 2 by recording a relative velocity $v_r$ and a distance $R_1$ to the object 2 detected by the object detecting device 1, and; a prediction process of predicting a future position and a future velocity of the object 2. Since the prediction process for predicting the future position and velocity of the object is a known technique, a detailed explanation will be omitted here.

The sensor device of FIG. 2 includes an object monitoring device such as a target tracking device or a radar device.

In Embodiment 1, an example will be described, in which the object detecting device 1 detects the object 2 by using a distance measurement system called a frequency modulation continuous wave (FMCW) system.

Figure 3:
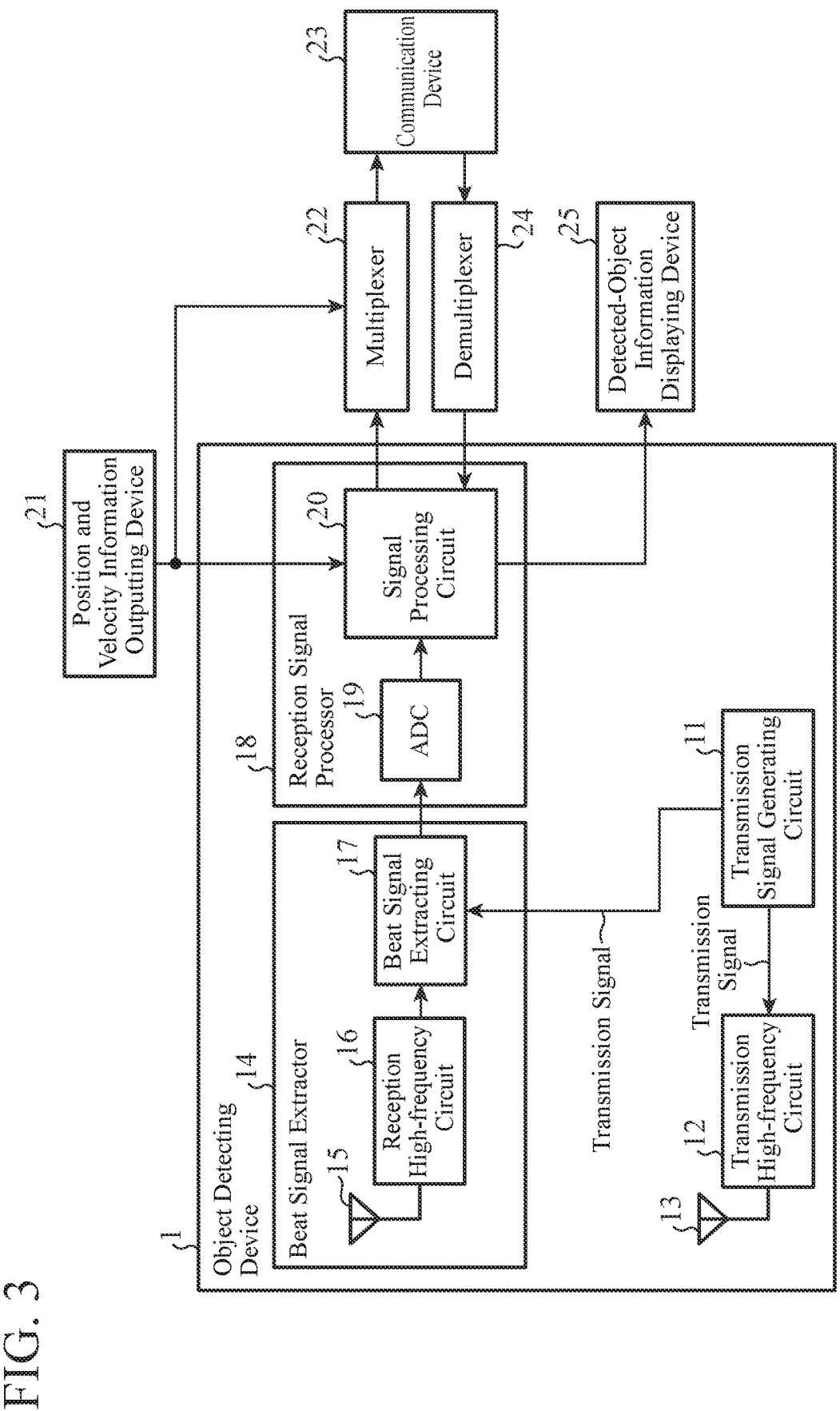
FIG. 3 is a structural diagram illustrating an object detecting device 1 according to Embodiment 1 of the present invention.

FIG. 3 is a structural diagram illustrating the object detecting device 1 according to Embodiment 1 of the present invention.

In FIG. 3, a transmission signal generating circuit 11 is implemented by, for example, a combiner, an oscillator, a processor, a digital to analog converter (DAC), and the like. The transmission signal generating circuit 11 generates a transmission signal subjected to frequency modulation in which the frequency changes over time, and outputs the transmission signal to a transmission high-frequency circuit 12 and a beat signal extracting circuit 17.

The processor may be, for example, a field-programmable gate array (FPGA), a Digital Signal Processor (DSP), a central processor (CPU), or the like.

Note that, when the transmission signal generating circuit 11 uses the DAC, a filter for removing harmonics may be provided at the output side of the DAC.

The transmission high-frequency circuit 12 performs: a frequency conversion process of converting a frequency of the transmission signal output from the transmission signal generating circuit 11 into a carrier frequency; a filter process of removing spurious emissions and out-of-band frequencies of the transmission signal; a power amplification process of amplifying power of the transmission signal; and the like. The transmission high-frequency circuit 12 outputs, as a transmission wave to a transmission antenna 13, the transmission signal obtained through the foregoing processes.

The transmission antenna 13 radiates to the space the transmission wave output from the transmission high-frequency circuit 12.

In the example of FIG. 1, the transmission wave is radiated to the space from the object detecting device 1a among the three object detecting devices 1a, 1b, and 1c, and transmission waves from the object detecting devices 1b and 1c are not radiated to the space. However, it is assumed that each of the object detecting devices 1b and 1c has the transmission signal generating circuit 11, the transmission high-frequency circuit 12, and the transmission antenna 13, similarly to the object detecting device 1a. It is also assumed that, in the object detecting devices 1a, 1b, and 1c, an output timing of the transmission signal from the transmission signal generating circuit 11 to the beat signal extracting circuit 17 is synchronized.

Note that, when the object detecting device 1 radiating the transmission wave to the space is always the object detecting device 1a, and the object detecting devices 1b and 1c do not radiate the transmission wave to the space, the object detecting device 1b and 1c do not have to include the transmission signal generating circuit 11, the transmission high-frequency circuit 12, and the transmission antenna 13. In this case, in order to extract a beat signal from a reception signal, the object detecting devices 1b and 1c need to acquire, through communication or the like, the transmission signal generated by the object detecting device 1a.

A beat signal extractor 14 includes a reception antenna 15, a reception high-frequency circuit 16, and the beat signal extracting circuit 17. The beat signal extractor 14 receives a signal reflecting off the object 2 to be detected, and extracts a beat signal from the received signal.

After the transmission wave is radiated from the transmission antenna 13 to the space, the reception antenna 15 receives a reflected wave for the transmission wave, which reflects off the object 2 to be detected.

The reception high-frequency circuit 16 performs: a frequency conversion process of converting the frequency of the reception signal of the reflected wave received by the reception antenna 15 into, for example, an intermediate (IF) frequency; a filter process of removing an image frequency during the frequency conversion and an unnecessary frequency included in the reception signal; a power amplification process of amplifying power of the reception signal by an amplifier such as a low noise amplifier (LNA); and the like. The reception high-frequency circuit 16 outputs to the beat signal extracting circuit 17 the reception signal obtained through the foregoing processes.

The beat signal extracting circuit 17 is implemented by, for example, a mixer or the like. The beat signal extracting circuit 17 extracts a beat signal from the reception signal by multiplying the reception signal output from the reception high-frequency circuit 16 and the transmission signal output from the transmission signal generating circuit 11 together.

The beat signal indicates a difference between a component of frequency modulation in the transmission signal and the frequency of the reception signal.

Figure 4:
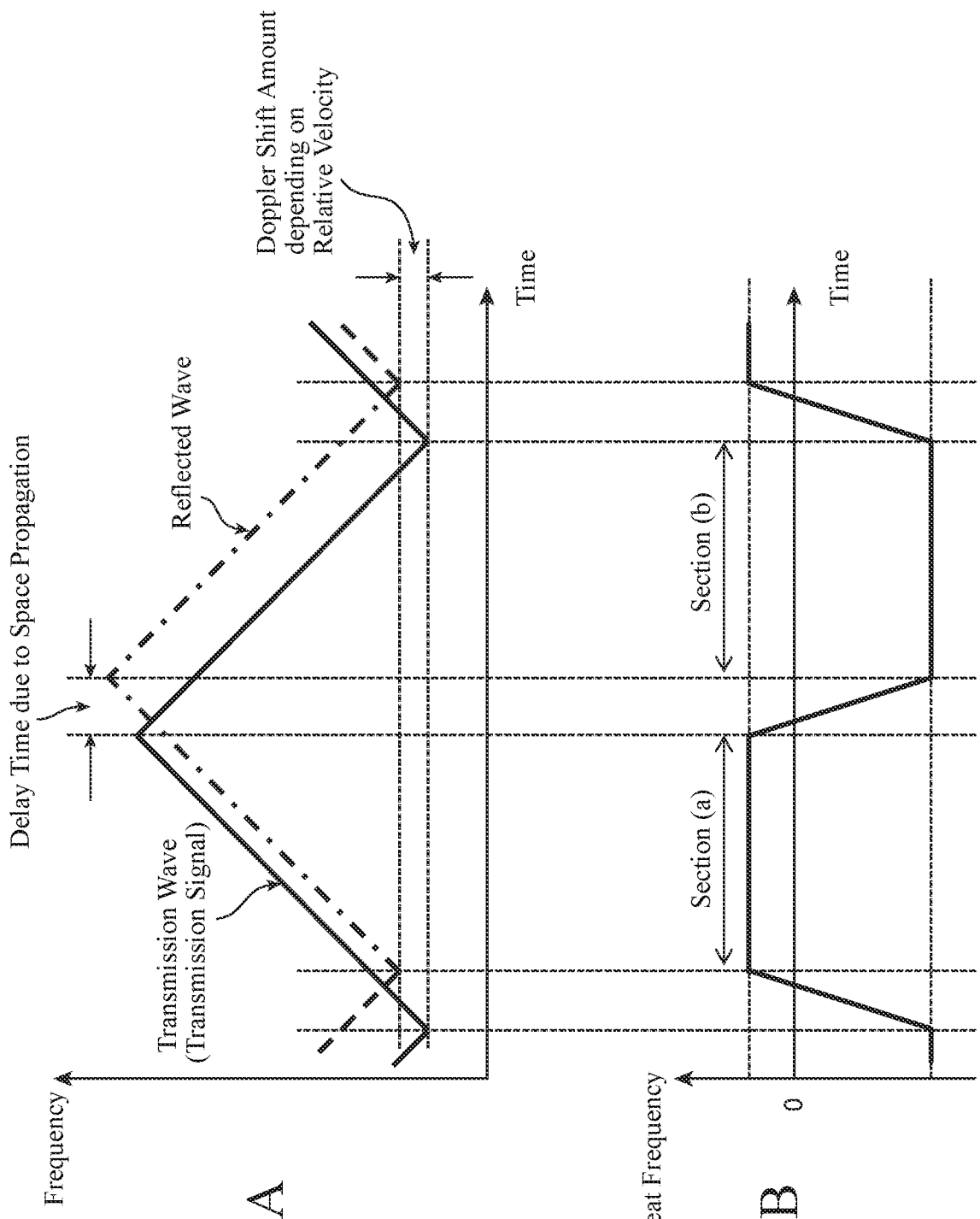
FIG. 4A is an explanatory diagram illustrating a transmission wave and a reflected wave whose frequencies change over time.
FIG. 4B is an explanatory diagram illustrating a beat signal whose beat frequency changes over time.

FIG. 4 is an explanatory diagram illustrating the transmission wave and reflected wave and the beat signal.

FIG. 4A illustrates the transmission wave and reflected wave whose frequencies change over time. FIG. 4B illustrates the beat signal whose beat frequency changes over time.

The transmission wave is delayed due to a space propagation time from the object detecting device 1a to the object 2 to be detected, and is subjected to the Doppler shift. As a result, the reflected wave reaches the reception antenna 15 with a frequency which is different from that of the transmission wave.

Note that, at the object detecting device 1a, a frequency shift occurs, which is twice as much as a Doppler shift caused by a relative moving velocity in a direction on a straight line connecting the object detecting device 1a and the object 2 to be detected.

At the object detecting device 1b, a frequency shift occurs, which is a sum of the foregoing Doppler shift regarding the object detecting device 1a and a Doppler shift caused by a relative moving velocity in a direction on a straight line connecting the object detecting device 1b and the object 2.

At the object detecting device 1c, a frequency shift occurs, which is a sum of the foregoing Doppler shift regarding the object detecting device 1a and a Doppler shift caused by a relative moving velocity in a direction on a straight line connecting the object detecting device 1c and the object 2.

A reception signal processor 18 includes an analog-to-digital converter (ADC) 19 and a signal processing circuit 20. The reception signal processor 18 performs a process of detecting the object 2 to be detected by using a beat signal extracted by the beat signal extractor 14 and a beat signal extracted from each of the other object detecting devices 1.

The ADC 19 converts the beat signal extracted by the beat signal extractor 14 into a digital signal and outputs a digital beat signal to the signal processing circuit 20.

The signal processing circuit 20 performs a process of detecting the object 2 by using the digital beat signal output from the ADC 19, the digital beat signal transmitted from each of the other object detecting devices 1, and the like.

A position and velocity information outputting device 21 is implemented by, for example, a global positioning system (GPS) receiver, a velocimeter, and the like. The position and velocity information outputting device 21 detects the position and velocity of the object detecting device 1 and outputs position and velocity information indicating the position and velocity of the object detecting device 1. Although it is desirable that the position of the object detecting device 1 is detected with higher accuracy, the position accuracy of the GPS signal received by the GPS receiver may be sufficient for that of the object detecting device 1.

Figure 5:
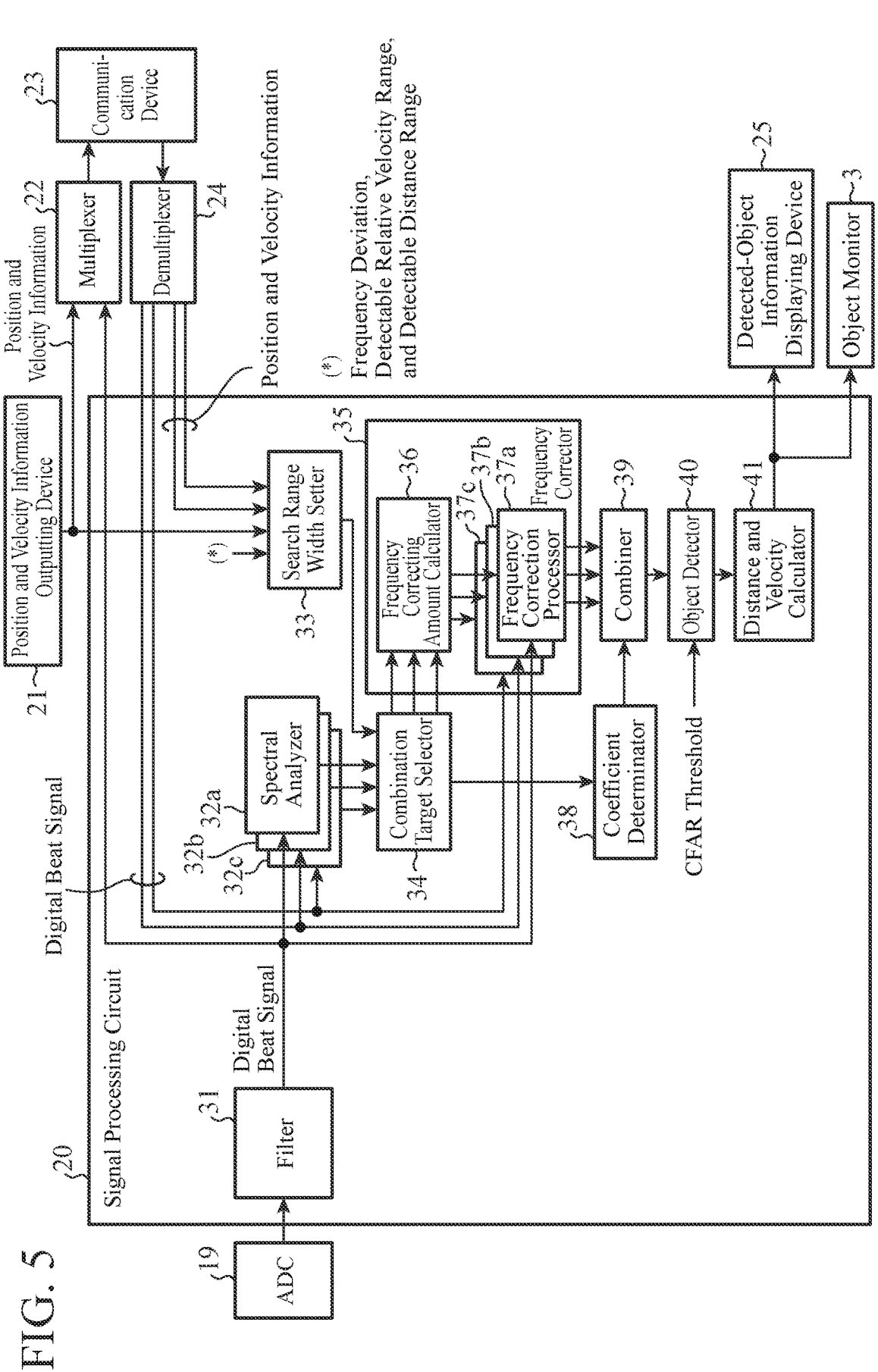
FIG. 5 is a structural diagram illustrating a signal processing circuit 20 of the object detecting device 1 according to Embodiment 1 of the present invention.

A multiplexer 22 multiplexes the digital beat signal having passed through a filter 31 of the signal processing circuit 20 illustrated in FIG. 5 and the position and velocity information output from the position and velocity information outputting device 21, and outputs the multiplexed signal to a communication device 23.

The communication device 23 transmits the multiplexed signal output from the multiplexer 22 to the other object detecting devices 1, and receives a multiplexed signal transmitted from each of the other object detecting devices 1. For example, assuming that the communication device 23 is a communication device in the object detecting device 1a, the communication device 23 transmits the multiplexed signal to the object detecting devices 1b and 1c, and receives multiplexed signals transmitted from the object detecting devices 1b and 1c. The transmission/reception of the multiplexed signal can be performed by wired or wireless communication.

A demultiplexer 24 de-multiplexes the multiplexed signal received by the communication device 23, and outputs a digital beat signal and the position and velocity information to the signal processing circuit 20.

A detected-object information displaying device 25 is implemented by, for example, a display, a graphics processing circuit, and the like. The detected-object information displaying device 25 displays information indicating a distance to the object 2 detected by the signal processing circuit 20 and a relative velocity.

Figure 6:
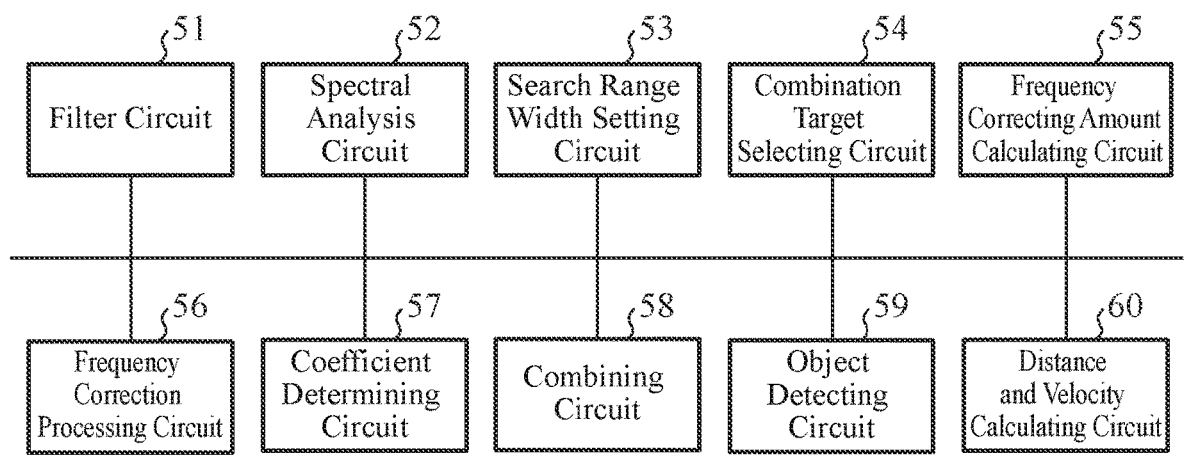
FIG. 6 is a hardware structural diagram of the signal processing circuit 20 of the object detecting device 1 according to Embodiment 1 of the present invention.

FIG. 5 is a structural diagram illustrating the signal processing circuit 20 of the object detecting device 1 according to Embodiment 1 of the present invention. FIG. 6 is a hardware structural diagram of the signal processing circuit 20 of the object detecting device 1 according to Embodiment 1 of the present invention.

In FIGS. 5 and 6, the filter 31 is implemented by, for example, a filter circuit 51 including a high-pass filter. The filter 31 removes a clutter component from the digital beat signal output by the ADC 19.

The spectral analyzers 32a, 32b, and 32c are implemented by, for example, a semiconductor integrated circuit mounting a CPU, or a spectral analysis circuit 52 using a one-chip microprocessor and the like.

The spectral analyzer 32a performs a process of analyzing a spectrum of the digital beat signal from which the clutter has been removed by the filter 31.

Each of the spectral analyzers 32b and 32c performs a process of analyzing a spectrum of the digital beat signal output from the demultiplexer 24, that is, a spectrum of the digital beat signal from which the clutter has been removed by a filter 31 provided in each of the other object detecting devices 1.

Hereinafter, the spectral analyzers 32a, 32b, and 32c may be simply expressed as a spectral analyzer 32 when they are not needed to distinguish from each other. In the example of Embodiment 1, since three object detecting devices 1 are provided, the signal processing circuit 20 includes three spectral analyzers 32. When N (N is an integer of equal to or more than 2) object detecting devices 1 are provided, the signal processing circuit 20 includes N spectral analyzers 32.

A search range width setter 33 is implemented by, for example, a semiconductor integrated circuit mounting a CPU, or a search range width setting circuit 53 using a one-chip microprocessor and the like.

The search range width setter 33 calculates a distance between the object detecting device 1 and each of the other object detecting devices 1 by using the velocity and position information output from the position and velocity information outputting device 21 and the velocity and position information output from the demultiplexer 24. The search range width setter 33 sets a search range width for frequency by using the foregoing distance calculated in advance, a velocity indicated by the velocity and position information output from the position and velocity information outputting device 21, a velocity indicated by the velocity and position information output from the demultiplexer 24, a detectable distance range of the object 2, a detectable relative velocity range of the object 2, and individual frequency deviations of the object detecting devices 1.

A combination target selector 34 is implemented by, for example, a semiconductor integrated circuit mounting a CPU, or a combination target selecting circuit 54 using a one-chip microprocessor and the like.

The combination target selector 34 determines, for each spectrum analyzed by the spectral analyzer 32, a frequency search range having the search range width set by the search range width setter 33. The determination of the frequency search range includes a process of comparing spectral components of each frequency of each individual spectrum analyzed by the spectral analyzers 32a, 32b, and 32c, and finding, on a basis of results of the comparison, the center frequency of the search range width set by the search range width setter 33.

In addition, the combination target selector 34 compares the spectral components of each frequency within the determined search range, and selects, as a combination target, a frequency having a relative large spectral component from among the frequencies existing within the search range, for each of the spectra analyzed by the spectral analyzers 32a, 32b, and 32c.

A frequency corrector 35 includes a frequency correcting amount calculator 36 and frequency correction processors 37a, 37b, and 37c.

The frequency correcting amount calculator 36 is implemented by, for example, a semiconductor integrated circuit mounting a CPU, or a frequency correcting amount calculating circuit 55 using a one-chip microprocessor and the like. The frequency correcting amount calculator 36 performs a process of calculating individual frequency correcting amounts by using differences between each of the frequencies of the combination targets selected by the combination target selector 34.

Each of the frequency correction processors 37a, 37b, and 37c is implemented by, for example, a semiconductor integrated circuit mounting a CPU, or a frequency correction processing circuit 56 using a one-chip microprocessor and the like.

The frequency correction processor 37a performs a process of correcting the frequency of the digital beat signal, whose clutter component has been removed by the filter 31, in accordance with the frequency correcting amount calculated by the frequency correcting amount calculator 36.

On the other hand, each of the frequency correction processors 37b and 37c performs a process of correcting the frequency of the digital beat signal output from the demultiplexer 24 in accordance with the frequency correcting amount calculated by the frequency correcting amount calculator 36. That is, each of the frequency correction processors 37b and 37c corrects the frequency of the digital beat signal whose clutter has been removed by a filter 31 provided in each of the other object detecting devices 1.

Hereinafter, the frequency correction processors 37a, 37b, and 37c may be simply expressed as a frequency correction processor 37 when they are not needed to distinguish from each other. In Embodiment 1, since three object detecting devices 1 are assumed, the signal processing circuit 20 includes three frequency correction processors 37. When N object detecting devices 1 exist, the signal processing circuit 20 includes N frequency correction processors 37.

A coefficient determinator 38 is implemented by, for example, a semiconductor integrated circuit mounting a CPU, or a coefficient determining circuit 57 using a one-chip microprocessor and the like.

The coefficient determinator 38 performs a process of determining, by using spectral components of the frequencies of the combination targets selected by the combination target selector 34, weighting coefficients which are used when combining the digital beat signal whose clutter has been removed by the filter 31 and the digital beat signal output from the demultiplexer 24.

A combiner 39 is implemented by, for example, a semiconductor integrated circuit mounting a CPU, or a combining circuit 58 using a one-chip microprocessor and the like. The combiner 39 performs a process of combining the beat signals whose frequencies are corrected by the frequency correction processors 37a, 37b, and 37c by using the weighting coefficients determined by the coefficient determinator 38.

An object detector 40 is implemented by, for example, a semiconductor integrated circuit mounting a CPU, or an object detecting circuit 59 using a one-chip microprocessor and the like. The object detector 40 detects the object 2 by performing a process of Constant False Alarm Rate (CFAR) on a beat signal combined by the combiner 39.

In the process of CFAR, magnitude of noise is estimated by using frequencies obtained by adding a reflected wave and noise together and frequencies of noise alone, and stabilizing probability of detection errors of the noise with a CFAR threshold.

A distance and velocity calculator 41 is implemented by, for example, a semiconductor integrated circuit mounting a CPU, or a distance and velocity calculating circuit 60 using a one-chip microprocessor and the like. The distance and velocity calculator 41 performs a process of calculating a distance and a relative velocity between the object detecting device 1 and the object 2 detected by the object detector 40, and outputting the calculation result to the detected-object information displaying device 25 and the object monitor 3.

In FIG. 5, it is assumed that individual components of the signal processing circuit 20, namely, the filter 31, the spectral analyzers 32a, 32b, and 32c, the search range width setter 33, the combination target selector 34, the frequency correcting amount calculator 36, the frequency correction processor 37a, 37b, and 37c, the coefficient determinator 38, the combiner 39, the object detector 40, and the distance and velocity calculator 41 are realized by dedicated hardware. Alternatively, a computer may be used for realizing the signal processing circuit 20.

Figure 7:
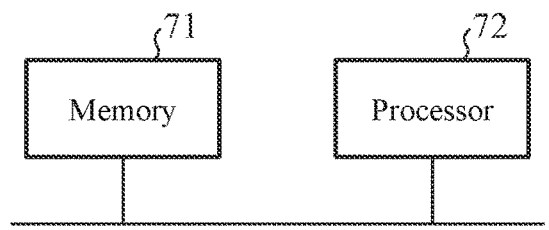
FIG. 7 is a hardware structural diagram when the signal processing circuit 20 is realized by a computer.

FIG. 7 is a hardware structural diagram when the signal processing circuit 20 is realized by a computer.

When the signal processing circuit 20 is realized by a computer, a program is stored in a memory 71 of the computer, the program describing processing details of the filter 31, the spectral analyzers 32a, 32b, and 32c, the search range width setter 33, the combination target selector 34, the frequency correcting amount calculator 36, the frequency correction processor 37a, 37b, and 37c, the coefficient determinator 38, the combiner 39, the object detector 40, and the distance and velocity calculator 41, and a processor 72 of the computer executes the program stored in the memory 71. As the processor 72 of the computer, a FPGA, a DSP, a CPU, or the like is applicable.

Figure 8:
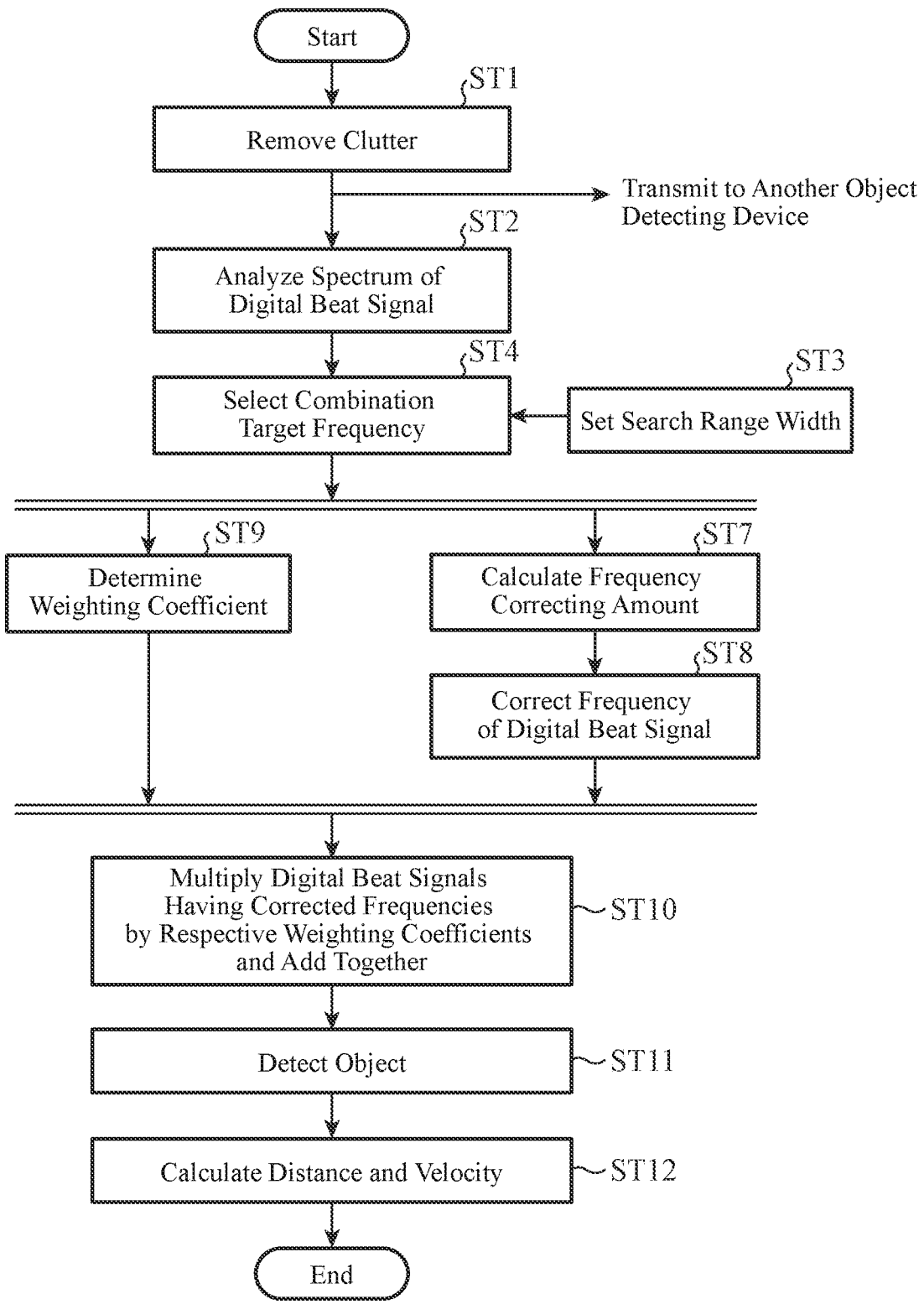
FIG. 8 is a flowchart illustrating processing details of the signal processing circuit 20.

FIG. 8 is a flowchart illustrating the processing details of the signal processing circuit 20.

Next, the operation will be described.

The transmission signal generating circuit 11 generates a transmission signal by performing frequency modulation that changes frequencies over time, as illustrated in FIG. 4A. The transmission signal generating circuit 11 outputs the transmission signal to the transmission high-frequency circuit 12 and the beat signal extracting circuit 17.

Upon receiving the transmission signal from the transmission signal generating circuit 11, the transmission high-frequency circuit 12 performs a process of converting a frequency of the transmission signal into a carrier frequency, a filter process of removing spurious emissions and out-of-band frequencies of the transmission signal, and a process of amplifying power of the transmission signal. The transmission high-frequency circuit 12 outputs, as a transmission wave to the transmission antenna 13, the transmission signal on which the foregoing processes have been performed.

After that, the transmission wave is radiated to the space from the transmission antenna 13.

The reception antenna 15 receives a reflected wave of the transmission wave which reflects off and returns from the object 2 to be detected after the radiation to the space by the transmission antenna 13. The reception antenna 15 outputs the reception signal of the reflected wave to the reception high-frequency circuit 16.

Upon receiving the reception signal from the reception antenna 15, the reception high-frequency circuit 16 performs a process of converting a frequency of the reception signal into the IF frequency, a filter process of removing an image frequency during the frequency conversion and an unnecessary frequency included in the reception signal, and a process of amplifying power of the reception signal. The reception high-frequency circuit 16 outputs, to the beat signal extracting circuit 17, the reception signal on which the foregoing processes have been performed.

Upon receiving the reception signal from the reception high-frequency circuit 16, the beat signal extracting circuit 17 extracts a beat signal from the reception signal by multiplying the reception signal and the transmission signal output from the transmission signal generating circuit 11 together, and outputs the beat signal to the reception signal processor 18.

The beat signal indicates a difference between a frequency modulation component of the transmission signal and a frequency of the reception signal. The absolute value of the beat frequency of the beat signal becomes larger as a delay time becomes longer.

In the example of FIG. 4B, the absolute value of the beat frequency in the section (a) is larger than that of the beat frequency in the section (b).

A difference in frequency occurs among the beat frequencies of reflected waves received by the object detecting devices 1a, 1b, and 1c.

That is, the frequency differences among the beat frequencies of the reflected waves occur due to the Doppler shift, a delay time difference caused by space propagation, and frequency deviations inside the object detecting devices 1a, 1b, and 1c.

Figure 9:
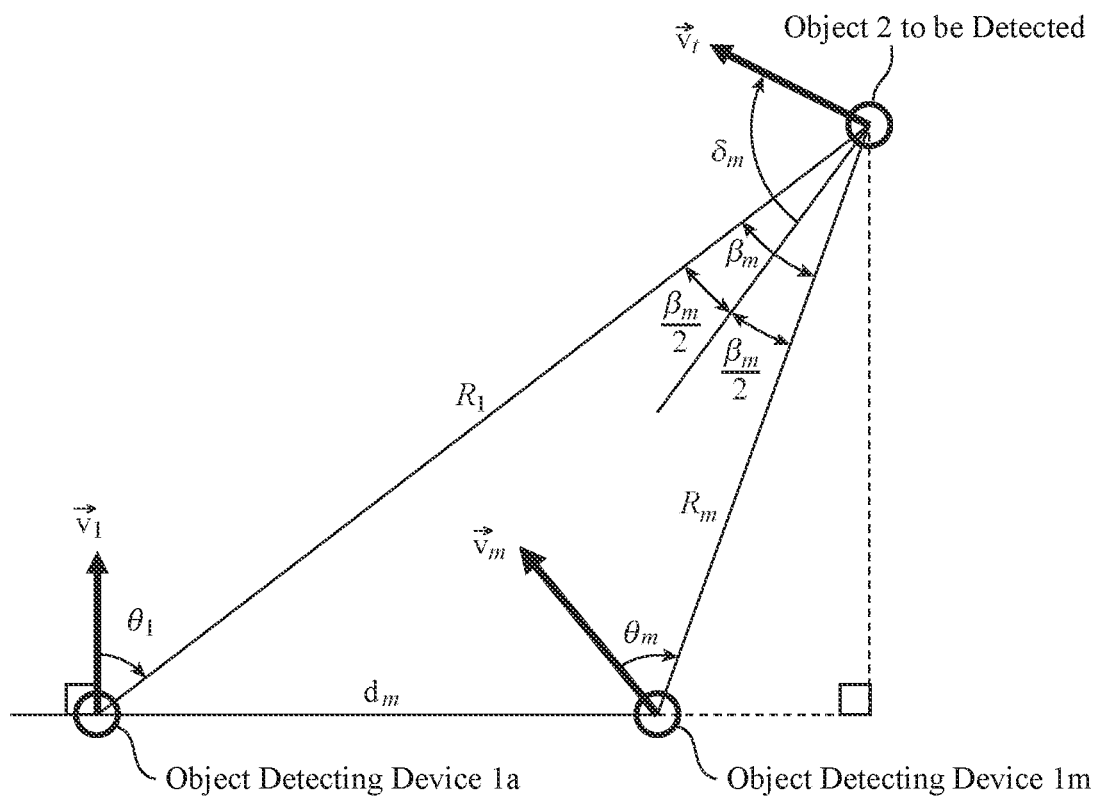
FIG. 9 is an explanatory diagram for explaining a difference in beat frequency between the object detecting device 1a and the object detecting device 1b or 1c.

FIG. 9 is an explanatory diagram for explaining a difference in beat frequency between the object detecting device 1a and the object detecting device 1b or 1c. In FIG. 9, the object detecting device 1m is the object detecting device 1b or the object detecting device 1c.

The Doppler shift will be described, which is one of factors affecting the beat frequency.

Defining that the Doppler shift caused by the reflected wave received by the object detecting device 1a is $f_{d1}$ and the Doppler shift caused by the reflected wave received by the object detecting device 1m is $f_{dm}$, the Doppler shifts $f_{d1}$ and $f_{dm}$ are expressed by formulas (1) and (2) below.

$$f_{d1} = \frac{v_{r1} + v_{r1}}{\lambda} \tag{1}$$

$$f_{dm} = \frac{v_{r1} + v_{rm}}{\lambda} \tag{2}$$

In the formulas (1) and (2), $\lambda$ is a wavelength of the transmission wave as a carrier wave and a reflected wave thereof, $v_{r1}$ is a relative velocity between the object detecting device 1a and the object 2 to be detected, and $v_{rm}$ is a relative velocity between the object detecting device 1m and the object 2.

Therefore, a difference in Doppler shift $\Delta f_{dm}$ between the object detecting device 1a and the object detecting device 1m is expressed by a formula (3) below.

$$\Delta f_{dm} = f_{dm} - f_{d1} = \frac{v_{rm} - v_{r1}}{\lambda} \tag{3}$$

In addition, a movement vector of the object detecting device 1a is denoted as a vector $v_1$, a movement vector of the object detecting device 1m is denoted as a vector $v_m$, and a movement vector of the object 2 to be detected is denoted as a vector $v_t$. Here, due to the electronic filing of the present application, each vector in the description is expressed by a "vector v" because the symbol "→" for a vector cannot be written above the corresponding character.

Defining that |vector $v_1$|=$v_1$, |vector $v_m$|=$v_m$, and |vector $v_t$|=$v_t$, a relative velocity $v_{r1}$ between the object detecting device 1a and the object 2 is expressed by a formula (4) below, and a relative velocity $v_{rm}$ between the object detecting device 1m and the object 2 is expressed by a formula (5) below.

$$v_{r1} = v_1 \cos(\theta_1) + v_t \cos(\delta_m - \beta_m/2) \tag{4}$$

$$v_{rm} = v_m \cos(\theta_m) + v_t \cos(\delta_m + \beta_m/2) \tag{5}$$

$$\beta_m = \theta_1 - \gamma_m = \theta_1 - \tan^{-1}\left(\frac{R_1 \sin(\theta_1) - d_m}{R_1 \sin(\theta_1)}\right) \tag{6}$$

Therefore, the difference in Doppler shift $\Delta f_{dm}$ between the object detecting device $1a$ and the object detecting device $1m$ can be expressed by the following parameters.

the velocity $v_1$ of the object detecting device $1a$ a direction $\theta_1$ from the object detecting device $1a$ to the object $2$ to be detected the velocity $v_m$ of the object detecting device $1m$ a direction $\theta_m$ from the object detecting device $1m$ to the object $2$ a distance $d_m$ between the object detecting device $1a$ and the object detecting device $1m$ the velocity $v_t$ of the object $2$ an angle $\delta_m$ indicating a moving direction of the object $2$ the distance $R_1$ between the object detecting device $1a$ and the object $2$ Ideally, among those parameters, the distance $d_m$ between the object detecting device $1a$ and the object detecting device $1m$ can be calculated from the position and velocity information output from the position and velocity information outputting device $21$ connected to the object detecting device $1a$, and the position and velocity information included in a multiplexed signal transmitted from the object detecting device $1m$.

Also, ideally, the velocity $v_1$ of the object detecting device $1a$ can be calculated from the position and velocity information output from the position and velocity information outputting device $21$. In addition, the velocity $v_m$ of the object detecting device $1m$ can be calculated from the position and velocity information included in the multiplexed signal transmitted from the object detecting device $1m$.

When a directional antenna is used as the reception antenna $15$ of each of the object detecting devices $1a$ and $1m$, the direction $\theta_1$ from the object detecting device $1a$ to the object $2$ and the direction $\theta_m$ from the object detecting device $1m$ to the object $2$ coincide with a directivity direction of a beam of the reception antenna $15$. For this reason, the reception antenna $15$ desirably has high directivity.

The velocity $v_t$ of the object $2$ that is a parameter depending on the object $2$, the angle $\delta_m$ indicating the moving direction of the object $2$, and the distance $R_1$ between the object detecting device $1a$ and the object $2$ are unknown.

Next, the delay time will be described, which is one of the factors affecting the beat frequency.

As understood by FIG. 4B, the longer the delay time is, the larger the absolute value of the beat frequency is.

Defining that a frequency change amount is $\xi$ [Hz/sec] with respect to time change per a unit time of the frequency modulation component in the transmission signal output from the transmission signal generating circuit $11$, a difference in beat frequency $\Delta f_{pm}$ caused by a propagation delay difference $\Delta R$ between the object detecting device $1a$ and the object detecting device $1m$ is expressed by a formula (7) below.

$$\Delta f_{pm} = \frac{\Delta R}{c} \xi \tag{7}$$

In the formula (7), c denotes the velocity of light.

The propagation delay difference $\Delta R$ in the formula (7) is expressed by a formula (8) below.

$$\Delta R = R_m - R_1 = \sqrt{(R_1\cos(\theta_1))^2 + (R_1\cos(\theta_1) - d_m)^2} - R_1 \tag{8}$$

Similarly to a foregoing calculation of the Doppler shift, the distance $d_m$ between the object detecting device $1a$ and the object detecting device $1m$, and the direction $\theta_1$ from the object detecting device $1a$ to the object $2$ to be detected are known, whereas the distance $R_1$ between the object detecting device $1a$ and the object $2$ is unknown.

The frequency deviation inside the object detecting devices $1a$ and $1m$ will be described. This is one of the factors affecting the beat frequency.

The frequency deviation inside the object detecting devices $1a$ and $1m$ is a total of frequency differences of the frequency modulation components in the transmission signal generating circuit $11$, the transmission high-frequency circuit $12$, and the reception high-frequency circuit $16$. Those frequency deviations can be determined by device design.

For example, if assuming that the frequency deviation inside the object detecting device $1a$ and the frequency deviation inside the object detecting device $1m$ are the same $\Delta f_s$, a difference in beat frequency $\Delta f_{bm}$ between the object detecting devices $1a$ and $1m$ is expressed as a formula (9) below.

$$\Delta f_{bm} = \Delta f_{dm} + \Delta f_{pm} + \Delta f_s \tag{9}$$

Accordingly, the difference in beat frequency $\Delta f_{bm}$ between the object detecting device $1a$ and the object detecting device $1m$ is determined by the velocity $v_t$ of the object $2$, the angle $\delta_m$ indicating the moving direction of the object $2$, and the distance $R_1$ between the object detecting device $1a$ and the object $2$.

Upon receiving the beat signal from the beat signal extractor $14$, the ADC $19$ of the reception signal processor $18$ converts the beat signal into a digital signal and outputs the digital beat signal to the signal processing circuit $20$.

Upon receiving the digital beat signal from the ADC $19$, the filter $31$ of the signal processing circuit $20$ removes a clutter component from the digital beat signal (step ST1 in FIG. 8).

The digital beat signal, from which the clutter has been removed by the filter $31$, is output to the spectral analyzer $32a$, the frequency correction processor $37a$, and the multiplexer $22$.

The position and velocity information outputting device $21$ detects the position and velocity of the object detecting device $1$, and outputs the position and velocity information indicating the position and velocity of the object detecting device $1$ to the search range width setter $33$ and the multiplexer $22$.

The multiplexer $22$ multiplexes the digital beat signal output from the filter $31$ and the position and velocity information output from the position and velocity information outputting device $21$, and outputs the multiplexed signal to the communication device $23$.

Upon receiving the multiplexed signal from the multiplexer $22$, the communication device $23$ transmits the multiplexed signal to each of the other object detecting devices $1$.

Similarly, when the other object detecting device $1$ combines a plurality of digital beat signals and detects the object $2$ from the combined signal, the multiplexed signal is transmitted to another different object detecting device $1$. However, if only a specific object detecting device $1$ is configured to perform the detection process of the object $2$ whereas the other object detecting devices $1$ are configured not to perform the detection process of the object $2$, the communication device $23$ connected to the specific object detecting device $1$ does not need to transmit the multiplexed signal to the other object detecting devices $1$.

In the above case, the communication device 23 connected to the other object detecting device 1 transmits the multiplexed signal to the specific object detecting device 1 that performs the detection process of the object 2.

In Embodiment 1, for simplicity of explanation, the description will be made by assuming that only the object detecting device 1a performs the detection process of the object 2 and the object detecting devices 1b and 1c do not perform the detection process of the object 2.

The communication device 23 connected to the object detecting device 1a receives the multiplexed signals transmitted from the object detecting devices 1b and 1c.

Upon receiving the multiplexed signals by the communication device 23, the demultiplexer 24 de-multiplexes the multiplexed signals, and outputs a digital beat signal included in each of the multiplexed signals to the spectral analyzers 32b and 32c, and the frequency correction processors 37b and 37c.

In addition, the demultiplexer 24 outputs the position and velocity information included in the multiplexed signals to the search range width setter 33.

Upon receiving a digital beat signal from the filter 31, the spectral analyzer 32a analyzes a spectrum of the digital beat signal (step ST2 in FIG. 8).

Upon receiving the digital beat signals from the demultiplexer 24, namely, receiving the digital beat signals, from which clutters have been removed by a filter 31 provided in each of the object detecting devices 1b and 1c, each of the spectral analyzers 32b and 32c analyzes a spectrum of the corresponding digital beat signal (step ST2 in FIG. 8).

For the foregoing spectral analysis of the digital beat signal, a discrete Fourier transform process or a fast Fourier transform process may be used. A result of the spectral analysis includes amplitude or power information as spectral components for each frequency, and also includes phase information for each frequency.

In the example of FIG. 4B, spectral analysis of the digital beat signal in the section (a) and spectral analysis of the digital beat signal in the section (b) are performed.

The search range width setter 33 calculates the distance $d_m$ between the object detecting device 1a and the object detecting device 1m (m=2, 3) by using the velocity and position information output from the position and velocity information outputting device 21 and the velocity and position information output from the demultiplexer 24.

After calculating the distance $d_m$ between the object detecting device 1a and the object detecting device 1m, the search range width setter 33 sets $\Delta f_w^m \times 2$ that is twice a search range width $\Delta f_w^m$ for frequency according to a formula (10) below, which uses the distance $d_m$, the velocity $v_1$ of the object detecting device 1a indicated by the velocity and position information output from the position and velocity information outputting device 21, the velocity $v_m$ of the object detecting device 1m indicated by the velocity and position information output from the demultiplexer 24, the detectable distance range of the object 2, the detectable relative velocity range of the object 2, and the frequency deviation $\Delta f_s$ of the device in the object detecting device 1 and the object detecting device 1m (step ST3 in FIG. 8).

$$\Delta f_w^m = \max(\Delta f_{bm}(R_1, \delta_m, v_t, d_m, \theta_1, v_1, v_m)) \quad (10)$$

Hereinafter, the process of setting the search range width $\Delta f_w^m$ will be specifically described, which is performed by the search range width setter 33.

The search range width setter 33 assigns, to the formula (10), the distance $d_m$ between the object detecting device 1a and the object detecting device 1m, the velocities $v_1$ and $v_m$, the frequency deviation $\Delta f_s$, and the direction $\theta_1$ from the object detecting device 1a to the object 2 to be detected, which is the directivity direction of the beam in the reception antenna 15. The search range width setter 33 calculates a difference in beat frequency $\Delta f_{bm}$ between the object detecting device 1a and the object detecting device 1m in accordance with the formula (9) while varying the velocity $v_t$ of the object 2, the angle $\delta_m$ indicating the moving direction of the object 2, and the distance $R_1$ between the object detecting device 1a and the object 2, which are unknown. The search range width setter 33 determines a difference in beat frequency $\Delta f_{bm}$ indicating a maximum, and sets the determined difference in beat frequency $\Delta f_{bm}$ to a search range width $\Delta f_w^m$ of frequency.

More specifically, in accordance with the formulas (3) to (6), the search range width setter 33 calculates the difference in Doppler shift $\Delta f_{dm}$ included in the difference in beat frequency $\Delta f_{bm}$.

At this time, a velocity in a detectable relative velocity range of the object 2, which is given from the outside, can be used for the unknown velocity $v_t$ of the object 2, and an angle in a range of 0° to 360° can be used for the unknown angle $\delta_m$ indicating the moving direction of the object 2.

The search range width setter 33 calculates the difference in Doppler shift $\Delta f_{dm}$ for the combination of the velocity $v_t$ of the object 2 and the angle $\delta_m$ indicating the moving direction of the object 2.

Subsequently, the search range width setter 33 calculates in accordance with the formulas (7) and (8) the difference in beat frequency $\Delta f_{pm}$ caused by the propagation delay difference $\Delta R$ between the object detecting device 1a and the object detecting device 1m.

At this time, a distance in the detectable distance range of the object 2, which is given from the outside, can be used for the unknown distance $R_1$ between the object detecting device 1a and the object 2, and the difference in beat frequency $\Delta f_{pm}$ is calculated for the number of distances $R_1$.

After calculating the difference in Doppler shift $\Delta f_{dm}$ for the combination of the velocity $v_t$ and the angle $\delta_m$, and the differences in beat frequency $\Delta f_{pm}$ for the number of distances $R_1$, the search range width setter 33 calculates in accordance with the formula (9) differences in beat frequency $f_{bm}$ between the object detecting device 1a and the object detecting device 1m by using the frequency deviation $\Delta f_s$ while making a combination of $\Delta f_{dm}$ and $\Delta f_{pm}$.

After calculating the differences in beat frequency $f_{bm}$, the search range width setter 33 determines a difference in beat frequency $\Delta f_{bm}$ indicating a maximum among the differences in beat frequency s $f_{bm}$, and sets twice the determined difference in beat frequency $\Delta f_{bm}$ as a search range width $\Delta f_w^m \times 2$.

In Embodiment 1, there are three object detecting devices 1a, 1b, and 1c. Therefore, a search range width $\Delta f_w^a \times 2$ for the object detecting device 1a, a search range width $\Delta f_w^b \times 2$ for the object detecting device 1b, and a search range width $\Delta f_w^c \times 2$ for the object detecting device 1c are set.

Note that, the distance $d_m$ between the object detecting device 1a and the object detecting device 1m, and the velocity $v_1$ of the object detecting device 1a and the velocity $v_m$ of the object detecting device 1m include a measurement error. In addition, the direction $\theta_1$ from the object detecting device 1a to the object 2 and the direction $\theta_m$ from the object detecting device 1m to the object 2 include an error with respect to an actual direction of the object 2 due to spread of the beam.

For the reason above, it is desirable to set $\Delta f_w^m \times 2$ as a search range width of frequency in consideration of the errors of the distance $d_m$, the velocities $v_1$ and $v_m$, and the directions $\theta_1$ and $\theta_m$.

The combination target selector 34 determines a frequency search range having the search range width $\Delta f_w^m$ set by the search range width setter 33 for each spectrum analyzed by the spectral analyzer 32.

After determining the frequency search range having the search range width $\Delta f_w^m$, the combination target selector 34 compares spectral components of frequencies in the determined search range for each spectrum analyzed by the spectral analyzer 32, and selects a frequency of a combination target from among the frequencies in the search range (step ST4 in FIG. 8).

Hereinafter, the process of selecting a frequency of a combination target performed by the combination target selector 34 will be specifically described.

The combination target selector 34 sets each frequency of the spectrum relating to the object detecting device 1a analyzed by the spectral analyzer 32a as x, and sets the spectral component of the frequency x as $f_b^a(x)$.

In addition, the combination target selector 34 sets each frequency of the spectrum relating to the object detecting device 1b analyzed by the spectral analyzer 32b as x, and sets the spectral component of the frequency x as $f_b^b(x)$.

Further, the combination target selector 34 sets each frequency of the spectrum relating to the object detecting device 1c analyzed by the spectral analyzer 32c as x, and sets the spectral component of the frequency x as $f_b^c(x)$.

The combination target selector 34 calculates each power $pow(f_b^a(x))$ of the spectral component $f_b^a(x)$ of the corresponding frequency x, and determines maximum power $max(pow(f_b^a(x)))$ among a plurality of the calculated powers $pow(f_b^a(x))$.

Similarly, the combination target selector 34 calculates each power $pow(f_b^b(x))$ of the spectral component $f_b^b(x)$ of the corresponding frequency x, and determines maximum power $max(pow(f_b^b(x)))$ among a plurality of the calculated powers $pow(f_b^b(x))$.

Similarly, the combination target selector 34 calculates each power $pow(f_b^c(x))$ of the spectral component $f_b^c(x)$ of the corresponding frequency x, and determines maximum power $max(pow(f_b^c(x)))$ among a plurality of the calculated powers $pow(f_b^c(x))$.

The combination target selector 34 determines the largest maximum power $max(pow(f_b^m(x)))$ among the maximum power $max(pow(f_b^a(x)))$, the maximum power $max(pow(f_b^b(x)))$, and the maximum power $max(pow(f_b^c(x)))$, in accordance with a formula (11) below. Here, m=1, 2, and 3.

After determining the largest maximum power $max(pow(f_b^m(x)))$, the combination target selector 34 determines a frequency $x^m_{max}$ at which the largest maximum power $max(pow(f_b^m(x)))$ is obtained, and the object detecting device 1 corresponding to the largest maximum power $max(pow(f_b^m(x)))$.

$$(m, x^m_{max}) = max(max(pow(f_b^a(x))), max(pow(f_b^b(x))), max(pow(f_b^c(x)))) \quad (11)$$

For convenience of description, it is assumed that the object detecting device 1 corresponding to the largest maximum power $max(pow(f_b^m(x)))$ is the object detecting device 1a.

When the object detecting device 1 corresponding to the largest maximum power $max(pow(f_b^m(x)))$ is the object detecting device 1a, the combination target selector 34 sets the frequency search range for the object detecting device 1a such that a frequency $x^a_{max}$, at which the maximum power $max(pow(f_b^a(x)))$ is obtained, becomes a center frequency of the search range width $\Delta f_w^a \times 2$ for the object detecting device 1a.

Specifically, the combination target selector 34 sets the frequency search range for the object detecting device 1a in accordance with a formula (12) below.

$$x^a_{max} - \Delta f_w^a \leq x \leq x^a_{max} + \Delta f_w^a \quad (12)$$

The combination target selector 34 sets the frequency search range for the object detecting device 1b such that the frequency $x^a_{max}$, at which the maximum power $max(pow(f_b^a(x)))$ is obtained, becomes a center frequency of the search range width $\Delta f_w^b \times 2$ for the object detecting device 1b.

Specifically, the combination target selector 34 sets the frequency search range for the object detecting device 1b in accordance with a formula (13) below.

$$x^a_{max} - \Delta f_w^b \leq x \leq x^a_{max} + \Delta f_w^b \quad (13)$$

Similarly, the combination target selector 34 sets the frequency search range for the object detecting device 1c such that the frequency $x^a_{max}$, at which the maximum power $max(pow(f_b^a(x)))$ is obtained, becomes a center frequency of the search range width $\Delta f_w^c \times 2$ for the object detecting device 1c.

Specifically, the combination target selector 34 sets the frequency search range for the object detecting device 1c in accordance with a formula (14) below.

$$x^a_{max} - \Delta f_w^c \leq x \leq x^a_{max} + \Delta f_w^c \quad (14)$$

The combination target selector 34 calculates each power $pow(f_b^a(x))$ of the spectral component $f_b^a(x)$ of the corresponding frequency x in the frequency search range for the object detecting device 1a, and determines the maximum power $max(pow(f_b^a(x)))$ among the calculated powers $pow(f_b^a(x))$.

The combination target selector 34 selects a frequency x for the maximum power $max(pow(f_b^a(x)))$ as a frequency $x^a_{sel}$ of the combination target.

The combination target selector 34 calculates each power $pow(f_b^b(x))$ of the spectral component $f_b^b(x)$ of the corresponding frequency x in the frequency search range for the object detecting device 1b, and determines the maximum power $max(pow(f_b^b(x)))$ among the calculated powers $pow(f_b^b(x))$.

The combination target selector 34 selects a frequency x for the maximum power $max(pow(f_b^b(x)))$ as a frequency $x^b_{sel}$ of the combination target.

Similarly, the combination target selector 34 calculates each power $pow(f_b^c(x))$ of the spectral component $f_b^c(x)$ of the corresponding frequency x in the frequency search range for the object detecting device 1c, and determines the maximum power $max(pow(f_b^c(x)))$ among the calculated powers $pow(f_b^c(x))$.

The combination target selector 34 selects a frequency x for the maximum power $max(pow(f_b^c(x)))$ as a frequency $x^c_{sel}$ of the combination target.

After selecting the frequency $x^a_{sel}$ of the combination target for the object detecting device 1a, the combination target selector 34 extracts amplitude $a^a = abs(f_b^a(x^a_{sel}))$ of the frequency $x^a_{sel}$ and extracts a phase $\varphi^a = arg(f_b^a(x^a_{sel}))$ of the frequency $x^a_{sel}$, and outputs the amplitude $a^a$ and the phase $\varphi^a$ of the frequency $x^a_{sel}$ to the coefficient determinator 38.

Note that, abs(•) denotes extraction of an amplitude component, and arg(•) denotes extraction of a phase component.

After selecting the frequency $x^b_{sel}$ of the combination target for the object detecting device $1b$, the combination target selector 34 extracts amplitude $a^b = \text{abs}(f_b^b(x^b_{sel}))$ of the frequency $x^b_{sel}$ and extracts a phase $\varphi^b = \arg(f_b^b(x^b_{sel}))$ of the frequency $x^b_{sel}$, and outputs the amplitude $a^b$ and the phase $\varphi^b$ of the frequency $x^b_{sel}$ to the coefficient determinator 38.

After selecting the frequency $x^c_{sel}$ of the combination target is selected from the frequency search range for the object detecting device $1c$, the combination target selector 34 extracts amplitude $a^c = \text{abs}(f_b^c(x^c_{sel}))$ of the frequency $x^c_{sel}$ and extracts a phase $\varphi^c = \arg(f_b^c(x^c_{sel}))$ of the frequency $x^c_{sel}$, and outputs the amplitude $a^c$ and the phase $\varphi^c$ of the frequency $x^c_{sel}$ to the coefficient determinator 38.

After the combination target selector 34 selects frequencies of the combination targets $x^a_{sel}$, $x^b_{sel}$, and $x^c_{sel}$, the frequency correcting amount calculator 36 calculates frequency correcting amounts $\Delta x_a$, $\Delta x_b$, and $\Delta x_c$ for the object detecting devices $1a$, $1b$, and $1c$, respectively, with reference to the frequency $x^a_{sel}$ of the combination target for the object detecting device $1a$, as shown in formulas (15) to (17) below, for the purpose of improving the combination gain when the plurality of digital beat signals is combined by the combiner 39 (step ST7 in FIG. 8).

$$\Delta x_a = (x^a_{sel} - x^a_{sel}) \tag{15}$$

$$\Delta x_b = (x^b_{sel} - x^a_{sel}) \tag{16}$$

$$\Delta x_c = (x^c_{sel} - x^a_{sel}) \tag{17}$$

After the frequency correcting amount $\Delta x_a$ for the object detecting device $1a$ is calculated by the frequency correcting amount calculator 36, the frequency correction processor $37a$ corrects the frequency of the digital beat signal, from which the clutter has been removed by the filter 31, in accordance with the frequency correcting amount $\Delta x_a$, as shown in a formula (18) below (step ST8 in FIG. 8).

$$s_a^c(t) = s_a(t) \times \exp(-\Delta x_a \times 2 \times \pi \times \text{DataInterval} \times t) \tag{18}$$

In the formula (18), $s_a(t)$ represents a time series signal of the digital beat signal output from the filter 31, and $s_a^c(t)$ represents a time series signal of the digital beat signal after the frequency correction. In addition, DataInterval is a sample time interval of the time series signal, and t is a sample number. The sample number is an integer.

After the frequency correcting amount $\Delta x_b$ for the object detecting device $1b$ is calculated by the frequency correcting amount calculator 36, the frequency correction processor $37b$ corrects the frequency of the digital beat signal output from the demultiplexer 24, that is, the frequency of the digital beat signal, from which the clutter has been removed by the filter 31 of the object detecting device $1b$, in accordance with the frequency correcting amount $\Delta x_b$, as shown in a formula (19) below (step ST8 in FIG. 8).

$$s_b^c(t) = s_b(t) \times \exp(-\Delta x_b \times 2 \times \pi \times \text{DataInterval} \times t) \tag{19}$$

In the formula (19), $s_b(t)$ represents a time series signal of the digital beat signal output from the filter 31 of the object detecting device $1b$, $s_b^c(t)$ represents a time series signal of the digital beat signal after the frequency correction.

After the frequency correcting amount $\Delta x_c$ for the object detecting device $1c$ is calculated by the frequency correcting amount calculator 36 calculates, the frequency correction processor $37c$ corrects the frequency of the digital beat signal output from the demultiplexer 24, that is, the frequency of the digital beat signal, from which the clutter has been removed by the filter 31 of the object detecting device $1c$, in accordance with the frequency correcting amount $\Delta x_c$, as shown in a formula (20) below (step ST8 in FIG. 8).

$$s_c^c(t) = s_c(t) \times \exp(-\Delta x_c \times 2 \times \pi \times \text{DataInterval} \times t) \tag{20}$$

In the formula (20), $s_c(t)$ represents a time series signal of the digital beat signal output from the filter 31 of the object detecting device $1c$, $s_c^c(t)$ represents a time series signal of the digital beat signal after the frequency correction.

Upon receiving each of the amplitude $a^a$ and phase $\varphi^a$ of the frequency $x^a_{sel}$ of the combination target, the amplitude $a^b$ and phase $\varphi^b$ of the frequency $x^b_{sel}$ of the combination target, and the amplitude $a^c$ and phase $\varphi^c$ of the frequency $x^c_{sel}$ of the combination target from the combination target selector 34, the coefficient determinator 38 determines weighting coefficients $w^a$, $w^b$, and $w^c$ used for combining the digital beat signals whose frequencies have been corrected by the frequency correction processors $37a$, $37b$, and $37c$, in accordance with formulas (21) to (23) below (step ST9 in FIG. 8).

$$w^a = \frac{a^a}{\sqrt{\sum_m (a^m)^2}} e^{-j\varphi^a} \tag{21}$$

$$w^b = \frac{a^b}{\sqrt{\sum_m (a^m)^2}} e^{-j\varphi^b} \tag{22}$$

$$w^c = \frac{a^c}{\sqrt{\sum_m (a^m)^2}} e^{-j\varphi^c} \tag{23}$$

In the formulas (21) to (23), m=1, 2, and 3.

After the weighting coefficients $w^a$, $w^b$, and $w^c$ are determined by the coefficient determinator 38, the combiner 39 combines the time series signals $s_a^c(t)$, $s_b^c(t)$, and $s_c^c(t)$ of the digital beat signals, whose frequencies have been corrected by the frequency correction processors $37a$, $37b$ and $37c$, by using the weighting coefficients $w^a$, $w^b$, and $w^c$ in accordance with a formula (24) below (step ST10 in FIG. 8).

$$y(t) = w^a s_a^c(t) + w^b s_b^c(t) + w^c s_c^c(t) \tag{24}$$

The combiner 39 outputs a combined signal y(t) to the object detector 40.

Note that, since the weighting coefficients $w^a$, $w^b$, and $w^c$ determined by the coefficient determinator 38 are the weights of maximum ratio combining, the signal power to noise power ratio is maximized by a combining process according to the formula (24).

Upon receiving the combined signal y(t) from the combiner 39, the object detector 40 detects the object 2 by performing the CFAR processing on the signal y(t) (step ST11 in FIG. 8).

Specifically, the object detector 40 analyzes the spectrum of the combined signal y(t), and determines that the object 2 to be detected exists when there is a spectral component equal to or more than the CFAR threshold, which has been given from the outside, among the spectral components of frequencies of the spectrum.

When it is determined that the object 2 to be detected exists, the object detector 40 outputs, as the beat frequency, a frequency corresponding to the spectral component equal to or more than the CFAR threshold to the distance and velocity calculator 41.

Upon receiving the beat frequency from the object detector 40, the distance and velocity calculator 41 calculates, by using the beat frequency, the distance $R_1$ from the object detecting device $1a$ to the object 2, and also calculates the relative velocity $v_r$ between the object detecting device 1$a$ and the object 2 (step ST12 in FIG. 8).

For example, in a case where the beat frequency $f_r^A$ in the section (a) and the beat frequency $f_r^B$ in the section (b) illustrated in FIG. 4B are obtained, the distance $R_1$ from the object detecting device 1$a$ to the object 2, and the relative velocity $v_r$ between the object detecting device 1$a$ and the object 2 can be calculated by solving equations shown in a formula (25) below.

$$f_r^A = \frac{2R_1}{c}\xi^A + \frac{2v_r}{\lambda} \quad (25)$$
$$f_r^B = \frac{2R_1}{c}\xi^B + \frac{2v_r}{\lambda}$$

In the formula (25), c is the velocity of light, $\lambda$ is a wavelength of the carrier wave, $\xi^A$ is a change amount of frequency with respect to the time change per unit time of the frequency modulation component in the section (a), $\xi^B$ is a frequency change amount with respect to the time change per unit time of the frequency modulation component in the section (b). In FIG. 4B, $\xi = \xi^A = -\xi^B$.

After calculating the distance $R_1$ from the object detecting device 1$a$ to the object 2, and the relative velocity $v_r$ between the object detecting device 1$a$ and the object 2, the distance and velocity calculator 41 outputs the distance $R_1$ and the relative velocity $v_r$ to the detected-object information displaying device 25 and the object monitor 3.

Depending on combinations of the frequencies of the combination targets selected by the combination target selector 34, the distance $R_1$ calculated by the distance and velocity calculator 41 may exceed the detectable distance range assumed in the object detecting device 1$a$. Similarly, the relative velocity $v_r$ calculated by the distance and velocity calculator 41 may exceed the detectable relative velocity range assumed in the object detecting device 1$a$.

When the distance $R_1$ calculated by the distance and velocity calculator 41 exceeds the detectable distance range assumed in the object detecting device 1$a$, or when the relative velocity $v_r$ calculated by the distance and velocity calculator 41 exceeds the detectable relative velocity range assumed in the object detecting device 1$a$, it is desirable that the distance $R_1$ and the relative velocity $v_r$ are not output to the detected-object information displaying device 25 and the object monitor 3.

Upon receiving, from the distance and velocity calculator 41, the distance $R_1$ from the object detecting device 1$a$ to the object 2, and the relative velocity $v_r$ between the object detecting device 1$a$ and the object 2, the detected-object information displaying device 25 displays the distance $R_1$ and the relative velocity $v_r$ on the display.

Upon receiving, from the distance and velocity calculator 41, the distance $R_1$ from the object detecting device 1$a$ to the object 2, and the relative velocity $v_r$ between the object detecting device 1$a$ and the object 2, the object monitor 3 performs a process of monitoring the object 2 by using the distance $R_1$ and the relative velocity $v_r$.

The monitoring processing of the object 2 by the object monitor 3 includes a process of recording a relative velocity $v_r$ and a distance $R_1$ to the object 2 detected by the object detecting device 1 and monitoring change in the position and velocity of the object 2, a process of predicting the future position and velocity of the object 2, and the like.

As is apparent from the above, according to Embodiment 1, there is provided: the spectral analyzers 32$a$, 32$b$, and 32$c$ for analyzing a spectrum of the beat signal extracted by the beat signal extractor 14 and the spectra of the beat signals extracted by the object detecting devices 1$b$ and 1$c$; the search range width setter 33 for setting a search range width for frequency; the combination target selector 34 for determining a frequency search range having the search range width set by the search range width setter 33, comparing spectral components of frequencies in the search range, and selecting, for each spectrum analyzed by the spectral analyzers 32$a$, 32$b$, and 32$c$, a frequency of a combination target from among the frequencies existing within the search range; and the frequency corrector 35 for calculating frequency correcting amounts from differences between each of the frequencies of the combination targets selected by the combination target selector 34, and correcting a frequency of the beat signal extracted by the beat signal extractor 14 and frequencies of the beat signals extracted by the object detecting devices 1$b$ and 1$c$ in accordance with each of the frequency correcting amounts, and the combiner 39 for combining the beat signals whose frequencies have been corrected by the frequency corrector 35. Therefore, it is capable of bringing an effect of enhancing the detection probability of the object 2 to be detected without acquiring the position information of the object 2 in advance.

That is, according to Embodiment 1, by selecting frequencies of combination targets from among frequencies included in the reflected waves received by the object detecting devices 1$a$, 1$b$, and 1$c$ by the search range width setter 33, the probability of erroneously combining frequencies, which are not relating to the object 2, is reduced.

In addition, the frequencies of the beat signals extracted by the object detecting devices 1$a$, 1$b$, and 1$c$ are corrected by the frequency corrector 35. Therefore, even when the frequencies of the beat signals extracted by the object detecting devices 1$a$, 1$b$, and 1$c$ are different from each other, it is possible to suppress a decrease in gain caused by combination.

Further, the beat signals whose frequencies are corrected by the frequency corrector 35 are combined by the combiner 39, whereby a combined signal is obtained with an improved signal power to noise power ratio. For this reason, object detection accuracy in the object detector 40 and the calculation accuracy of the distance and velocity in the distance and velocity calculator 41 are improved.

In Embodiment 1, when the plurality of object detecting devices 1 is installed apart from each other, the beat signals extracted by the plurality of object detecting devices 1 can be combined without calculating the distances among the object detecting devices 1 in the wavelength order.

In a case where the distances among the plurality of object detecting devices 1 are fixed, namely for example, when the plurality of object detecting devices 1 is fixed on the ground, or when the plurality of object detecting devices 1 is installed in one moving platform, the distances do not change over time. Therefore, even if lowering the accuracy of the distances among the object detecting devices 1, it is possible to obtain a combined signal of the plurality of beat signals capable of enhancing the detection probability of the object 2.

In addition, in a case where the object detecting devices 1 are installed on different moving platforms from each other, and the distances among the object detecting devices 1 are fixed, it is possible to obtain a combined signal of the plurality of beat signals capable of enhancing the detection probability of the object 2 even if lowering the accuracy of the distance between the plurality of object detecting devices 1.

In Embodiment 1, although the example has been described, in which the object detecting device 1 detects the object 2 by the distance measurement system called as the FMCW system, the present invention is not limited thereto. For example, the object 2 may be detected by a distance measurement system called as a frequency modulation interrupted continuous wave (FMICW) system.

Hereafter, a difference between the FMCW system and the FMICW system will be briefly described.

FIG. 10 is an explanatory diagram illustrating the transmission wave and reflected wave and the beat signal.

FIG. 10A illustrates a transmission signal including a plurality of pulses, and FIG. 10B illustrates a reception signal including a plurality of pulses.

FIG. 10C illustrates the transmission wave and reflected wave whose frequencies change over time, and FIG. 10D illustrates the beat signal whose beat frequency changes over time.

In the FMICW system, a transmission signal generated by the transmission signal generating circuit 11 forms a pulse train as illustrated in FIG. 10A. A transmission wave illustrated in FIG. 10C, on which the frequency modulation similar to the FMCW system has been performed, is radiated from the transmission antenna 13.

A reflected wave received by the reception antenna 15 is received as a pulse train with a propagation delay as illustrated in FIGS. 10B and 10C.

Since the Doppler shift similar to the case of the FMCW system occurs, the reflected wave has time delays as illustrated in FIG. 10C, and the frequency of the reflected wave is frequency-shifted by the Doppler shift.

The beat signal extracting circuit 17 takes a difference between the reception signal of the reflected wave and the frequency modulation component of the transmission signal generated by the transmission signal generating circuit 11. The frequency modulation component is the same as in the case of the FMCW system.

As illustrated in FIG. 10D, the output of the beat signal extracting circuit 17 forms a pulse train having a beat frequency similarly to the case of the FMCW system.

FIG. 11 is an explanatory diagram illustrating an output signal of the beat signal extracting circuit 17.

Figure 11A:
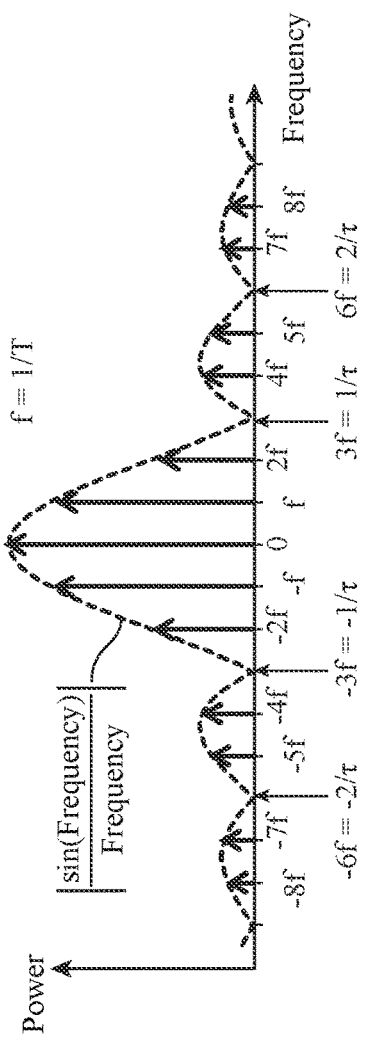
FIG. 11A is an explanatory diagram illustrating an output signal of a beat signal extracting circuit 17.
Figure 11D:
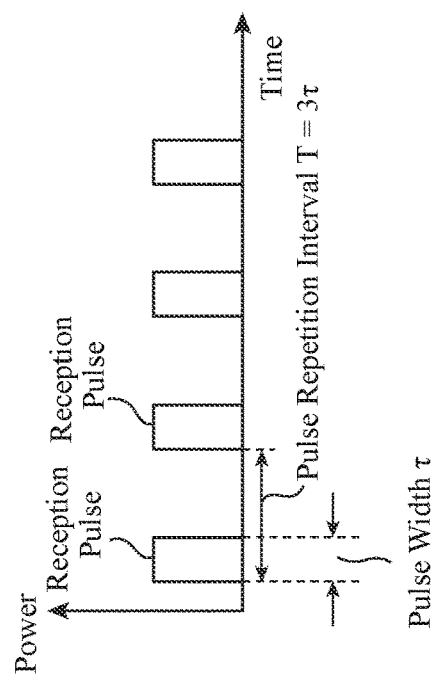
FIG. 11D is an explanatory diagram enlarging a vicinity of a frequency of 0 Hz in FIG. 11C.
Figure 11B:
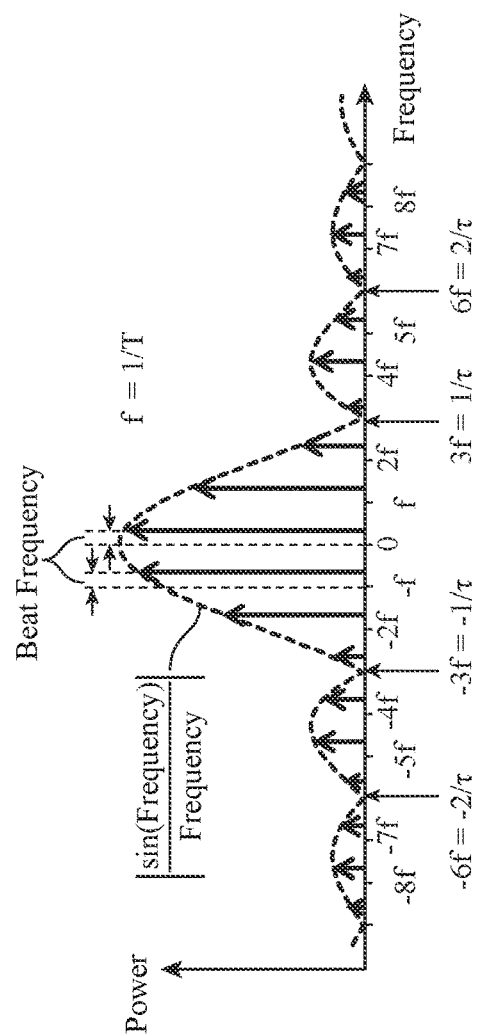
FIG. 11B is an explanatory diagram illustrating a spectrum when the Doppler shift does not occur in the reflected wave.

FIG. 11A illustrates the output signal of the beat signal extracting circuit 17, and FIG. 11B illustrates the spectrum in a case where the Doppler shift does not occur in the reflected wave.

Figure 11C:
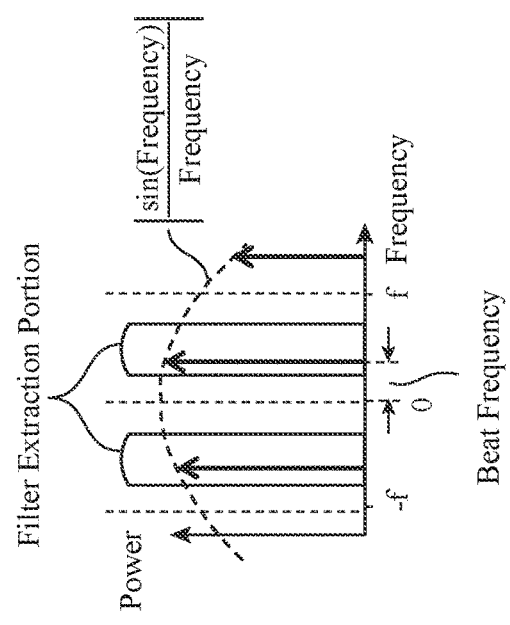
FIG. 11C is an explanatory diagram illustrating a spectrum when the Doppler shift occurs in the reflected wave.

FIG. 11C illustrates the spectrum in a case where the Doppler shift occurs in the reflected wave, and FIG. 11D is a diagram obtained by enlarging a vicinity of a frequency of 0 Hz in FIG. 11C.

Assuming that the pulse width of the pulse generated by the transmission signal generating circuit 11 is τ and the pulse repetition interval is T=3τ, the spectrum appears as illustrated in FIG. 11B when the Doppler shift does not occur in the reflected wave.

The envelope of the spectrum is expressed by |sin(frequency)/frequency|, and the power becomes 0 every n/τ. Note that, n is an arbitrary integer other than zero.

On the other hand, if the Doppler shift occurs in the reflected wave, the spectrum of the reception pulse train as the reception signal becomes a spectrum with an envelope, which is repeated every 1/T, as illustrated in FIGS. 11C and 11D.

The reception pulse train, which has the spectrum illustrated in FIGS. 11C and 11D, is sampled by the ADC 19 and input to the filter 31.

Figure 12:
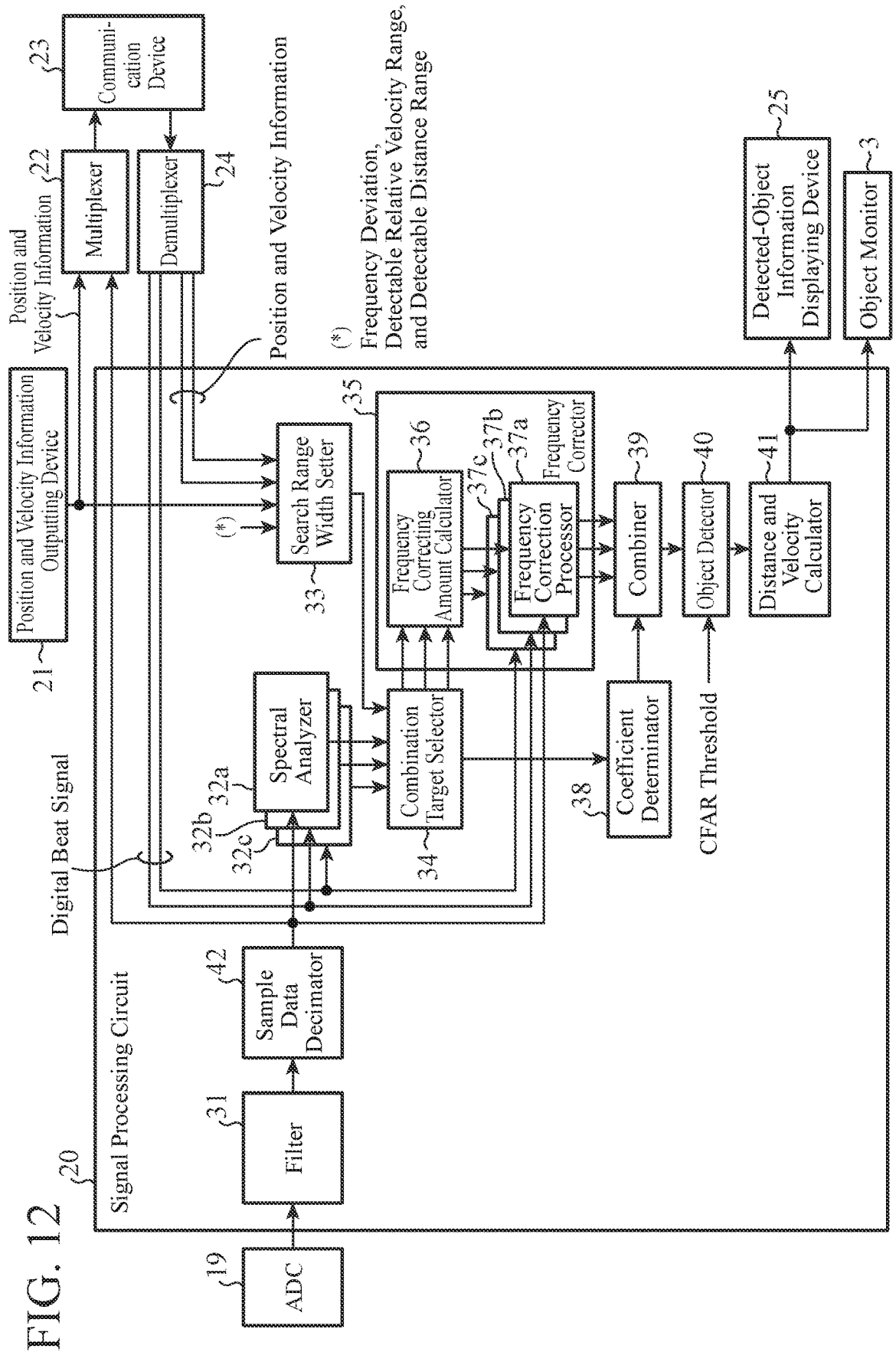
FIG. 12 is a structural diagram illustrating another type of a signal processing circuit 20 of the object detecting device 1 according to Embodiment 1 of the present invention.

In the case of the FMICW system, the signal processing circuit 20 is configured as illustrated in FIG. 12.

The filter 31 of the signal processing circuit 20 in FIG. 12 extracts only the filter extraction portions illustrated in FIG. 11D in order to remove the clutter near 0 Hz and also remove the repetitive portions of the spectrum repeated every 1/T.

For the purpose of lowering the signal processing speed at the subsequent stage to the filter 31, a sample data decimator 42 is provided for performing a process of narrowing the representation band of the time series signal of the output signal of the filter 31.

The subsequent processing is similar to the case of the FMCW system.

Embodiment 2

In the foregoing Embodiment 1, the combination target selector 34 selects, as a frequency of a combination target, a frequency having a relative large spectral component among frequencies existing within the search range. With this configuration, it may be possible to select a frequency of the object 2 to be detected. On the other hand, when the frequency of the object 2 is not actually included in the frequencies in the search range, noise in the reflected wave may be selected as the frequency of the combination target.

In Embodiment 2 that will be described hereinafter, in order not to select the noise in the reflected wave as the frequency of the combination target, the combination target selector 34 selects a frequency, whose spectral component is larger than a threshold, among the frequencies existing within the search range.

Hereinafter, the selecting process will be specifically described of the frequency of the combination target at the combination target selector 34.

Similarly to Embodiment 1, the combination target selector 34 sets each frequency of the spectrum relating to the object detecting device 1a analyzed by the spectral analyzer 32a as x, and sets the spectral component of the frequency x as $f_b^a(x)$, and calculates each power $pow(f_b^a(x))$ of the spectral component $f_b^a(x)$ of the corresponding frequency x.

In addition, the combination target selector 34 sets each frequency of the spectrum relating to the object detecting device 1b analyzed by the spectral analyzer 32b as x, sets the spectral component of the frequency x as $f_b^b(x)$, and calculates each power $pow(f_b^b(x))$ of the spectral component $f_b^b(x)$ of the corresponding frequency x.

Further, the combination target selector 34 sets each frequency of the spectrum relating to the object detecting device 1c analyzed by the spectral analyzer 32c as x, sets the spectral component of the frequency x as $f_b^c(x)$, and calculates each power $pow(f_b^c(x))$ of the spectral component $f_b^c(x)$ of the corresponding frequency x.

Subsequently, the combination target selector 34 compares each power $pow(f_b^a(x))$ of the spectral component $f_b^a(x)$ of the corresponding frequency x with a preset threshold. When there is power $pow(f_b^a(x))$ larger than the threshold among the powers $pow(f_b^a(x))$ of respective frequencies x, the combination target selector 34 selects, as a frequency $x^a_{sel}$ of a combination target, a frequency of the power $pow(f_b^a(x))$ larger than the threshold.

Similarly, the combination target selector 34 compares each power $pow(f_b^b(x))$ of the spectral component $f_b^b(x)$ of the corresponding frequency x with a preset threshold. When there is power $pow(f_b^b(x))$ larger than the threshold among the powers $pow(f_b^b(x))$ of respective frequencies x, the combination target selector 34 selects, as a frequency $x^b_{sel}$ of a combination target, a frequency of the power $pow(f_b^b(x))$ larger than the threshold.

Similarly, the combination target selector 34 compares each power $pow(f_b^c(x))$ of the spectral component $f_b^c(x)$ of the corresponding frequency x with a preset threshold. When there is power $pow(f_b^c(x))$ larger than the threshold among the powers $pow(f_b^c(x))$ of respective frequencies x, the combination target selector 34 selects, as a frequency $x^c_{sel}$ of a combination target, a frequency of the power $pow(f_b^c(x))$ larger than the threshold.

In the foregoing configuration, the combination target selector 34 compares the power of a spectral component of each frequency x with the threshold. Alternatively, the amplitude of the spectral component of each frequency x may be compared with the threshold.

Here, it is assumed that no frequency x is selected as a frequency $x^m_{sel}$ of a combination target (m=1, 2, and 3) for each object detecting device 1, or assumed that multiple frequencies x are selected.

When no frequency x is selected as the frequency $x^a_{sel}$ of the combination target for the object detecting device 1a, the frequency correcting amount calculator 36 sets the frequency correcting amounts $\Delta x_a$, $\Delta x_b$, and $\Delta x_c$ for the object detecting devices 1a, 1b, and 1c, respectively, to zero.

When multiple frequencies x are selected as the frequency $x^a_{sel}$ of the combination target for the object detecting device 1a, the frequency correcting amount calculator 36 calculates the frequency correcting amounts $\Delta x_a$, $\Delta x_b$, and $\Delta x_c$ in the following manner.

For convenience of description, it is assumed that a couple of frequencies x are individually selected as the frequency $x^a_{sel}$ of the combination target, and the selected frequencies x are expressed as a frequency $x^a_{sel1}$ and a frequency $x^a_{sel2}$.

In addition, it is assumed that a couple of frequencies x are individually selected as the frequency $x^b_{sel}$ of the combination target, and the selected frequencies x are expressed as a frequency $x^b_{sel1}$ and a frequency $x^b_{sel2}$.

Further, it is assumed that a single frequency x is selected as the frequency $x^c_{sel}$ of the combination target.

First, in accordance with formulas (26) to (29) below, the frequency correcting amount calculator 36 calculates the frequency correcting amounts $\Delta x_{a1}$, $\Delta x_{b1}$, $\Delta x_{b2}$, and $\Delta x_{c1}$ for the object detecting devices 1a, 1b, and 1c, with reference to the frequency $x^a_{sel1}$.

$$\Delta x_{a1} = (x^a_{sel1} - x^a_{sel1}) \tag{26}$$

$$\Delta x_{b1} = (x^b_{sel1} - x^a_{sel1}) \tag{27}$$

$$\Delta x_{b2} = (x^b_{sel2} - x^a_{sel1}) \tag{29}$$

$$\Delta x_{c1} = (x^c_{sel} - x^a_{sel1}) \tag{29}$$

In addition, in accordance with formulas (30) to (33) below, the frequency correcting amount calculator 36 calculates the frequency correcting amounts $\Delta x_{a2}$, $\Delta x_{b3}$, $\Delta x_{b4}$, and $\Delta x_{c2}$ for the object detecting devices 1a, 1b, and 1c, with reference to the frequency $x^a_{sel2}$.

$$\Delta x_{a2} = (x^a_{sel2} - x^a_{sel2}) \tag{30}$$

$$\Delta x_{b3} = (x^b_{sel1} - x^a_{sel2}) \tag{31}$$

$$\Delta x_{b4} = (x^b_{sel2} - x^a_{sel2}) \tag{32}$$

$$\Delta x_{c1} = (x^c_{sel} - x^a_{sel2}) \tag{33}$$

After the frequency correcting amount calculator 36 calculates the frequency correcting amounts $\Delta x_{a1}$ and $\Delta x_{a2}$ for the object detecting device 1a, the frequency correction processor 37a corrects the frequency of the digital beat signal, from which the clutter has been removed by the filter 31, in accordance with the frequency correcting amount $\Delta x_{a1}$ and $\Delta x_{a2}$, as shown in formulas (34) and (35) below.

$$s_{a1}^c(t) = s_a(t) \times \exp(-\Delta x_{a1} \times 2 \times \pi \times \text{DataInterval} \times t) \tag{34}$$

$$s_{a2}^c(t) = s_a(t) \times \exp(-\Delta x_{a2} \times 2 \times \pi \times \text{DataInterval} \times t) \tag{35}$$

In the formulas (34) and (35), $s_{a1}^c(t)$ represents a time series signal of the digital beat signal corrected by the frequency correcting amount $\Delta x_{a1}$, and $s_{a2}^c(t)$ represents a time series signal of the digital beat signal corrected by the frequency correcting amount $\Delta x_{a2}$.

After the frequency correcting amount calculator 36 calculates the frequency correcting amounts $\Delta x_{b1}$, $\Delta x_{b2}$, $\Delta x_{b3}$, and $\Delta x_{b4}$ for the object detecting device 1b, the frequency correction processor 37b corrects the frequency of the digital beat signal output from the demultiplexer 24, that is, the frequency of digital beat signal, from which the clutter has been removed by the filter 31 of the object detecting device 1b, in accordance with the frequency correcting amounts $\Delta x_{b1}$, $\Delta x_{b2}$, $\Delta x_{b3}$, and $\Delta x_{b4}$, as shown in formulas (36) to (39) below.

$$s_{b1}^c(t) = s_b(t) \times \exp(-\Delta x_{b1} \times 2 \times \pi \times \text{DataInterval} \times t) \tag{36}$$

$$s_{b2}^c(t) = s_b(t) \times \exp(-\Delta x_{b2} \times 2 \times \pi \times \text{DataInterval} \times t) \tag{37}$$

$$s_{b3}^c(t) = s_b(t) \times \exp(-\Delta x_{b3} \times 2 \times \pi \times \text{DataInterval} \times t) \tag{38}$$

$$s_{b4}^c(t) = s_b(t) \times \exp(-\Delta x_{b4} \times 2 \times \pi \times \text{DataInterval} \times t) \tag{39}$$

In the formulas (36) to (39), $s_{b1}^c(t)$ represents a time series signal of the digital beat signal corrected by the frequency correcting amount $\Delta x_{b1}$, $s_{b2}^c(t)$ represents a time series signal of the digital beat signal corrected by the frequency correcting amount $\Delta x_{b2}$, $s_{b3}^c(t)$ represents a time series signal of the digital beat signal corrected by the frequency correcting amount $\Delta x_{b3}$, and $s_{b4}^c(t)$ represents a time series signal of the digital beat signal corrected by the frequency correcting amount $\Delta x_{b4}$.

After the frequency correcting amount calculator 36 calculates the frequency correcting amounts $\Delta x_{c1}$ and $\Delta x_{c2}$ for the object detecting device 1c, the frequency correction processor 37c corrects the frequency of the digital beat signal output from the demultiplexer 24, that is, the frequency of the digital beat signal, from which the clutter has been removed by the filter 31 of the object detecting device 1c, in accordance with the frequency correcting amounts $\Delta x_{c1}$ and $\Delta x_{c2}$, as shown in formulas (40) to (41) below.

$$s_{c1}^c(t) = s_c(t) \times \exp(-\Delta x_{c1} \times 2 \times \pi \times \text{DataInterval} \times t) \tag{40}$$

$$s_{c2}^c(t) = s_c(t) \times \exp(-\Delta x_{c2} \times 2 \times \pi \times \text{DataInterval} \times t) \tag{41}$$

In the formulas (40) and (41), $s_{c1}^c(t)$ represents a time series signal of the digital beat signal corrected by the frequency correcting amount $\Delta x_{c1}$, and $s_{c2}^c(t)$ represents a time series signal of the digital beat signal corrected by the frequency correcting amount $\Delta x_{c2}$.

Upon receiving each of amplitude $a^{a1}$ and phase $\varphi^{a1}$ of the frequency $x^a_{sel1}$ of the combination target, amplitude $a^{a2}$ and phase $\varphi^{a2}$ of the frequency $x^a_{sel2}$, amplitude $a^{b1}$ and phase $\varphi^{b1}$ of the frequency $x^b_{sel1}$ of the combination target, amplitude $a^{b2}$ and phase $\varphi^{b2}$ of the frequency $x^b_{sel2}$, and the amplitude $a^c$ and phase $\varphi^c$ of the frequency $x^c_{sel}$ of the combination target from the combination target selector 34, the coefficient determinator 38 determines weighting coefficients $w_1^a$ to $w_4^a$, $w_1^b$ to $w_4^b$, and $w_1^c$ to $w_4^c$ used for combining the digital beat signals, whose frequencies have been corrected by the frequency correction processors 37a, 37b and 37c, for the combination of the frequencies $x^a_{sel1}$ and $x^a_{sel2}$ of the combination target, the frequencies $x^b_{sel1}$ and $x^b_{sel2}$ of the combination target, and the frequency $x^c_{sel}$ of the combination target.

[For a Combination of the Frequencies $x^a_{sel1}$, $x^b_{sel1}$, and $x^c_{sel}$]

$$w_1^a = \frac{a^{a1}}{\sqrt{\sum_m (a^m)^2}} e^{-j\phi^{a1}} \quad (42)$$

$$w_1^b = \frac{a^{b1}}{\sqrt{\sum_m (a^m)^2}} e^{-j\phi^{b1}} \quad (43)$$

$$w_1^c = \frac{a^c}{\sqrt{\sum_m (a^m)^2}} e^{-j\phi^c} \quad (44)$$

[For a Combination of Frequencies $x^a_{sel1}$, $x^b_{sel2}$, and $x^c_{sel}$]

$$w_2^a = \frac{a^{a1}}{\sqrt{\sum_m (a^m)^2}} e^{-j\phi^{a1}} \quad (45)$$

$$w_2^b = \frac{a^{b2}}{\sqrt{\sum_m (a^m)^2}} e^{-j\phi^{b2}} \quad (46)$$

$$w_2^c = \frac{a^c}{\sqrt{\sum_m (a^m)^2}} e^{-j\phi^c} \quad (47)$$

[For a Combination of the Frequencies $x^a_{sel1}$, $x^b_{sel2}$, and $x^c_{sel}$]

$$w_3^a = \frac{a^{a2}}{\sqrt{\sum_m (a^m)^2}} e^{-j\phi^{a2}} \quad (48)$$

$$w_3^b = \frac{a^{b1}}{\sqrt{\sum_m (a^m)^2}} e^{-j\phi^{b1}} \quad (49)$$

$$w_3^c = \frac{a^c}{\sqrt{\sum_m (a^m)^2}} e^{-j\phi^c} \quad (50)$$

[For a Combination of Frequencies $x^a_{sel2}$, $x^b_{sel2}$, and $x^c_{sel}$]

$$w_4^a = \frac{a^{a2}}{\sqrt{\sum_m (a^m)^2}} e^{-j\phi^{a2}} \quad (51)$$

-continued $$w_4^b = \frac{a^{b2}}{\sqrt{\sum_m (a^m)^2}} e^{-j\phi^{b2}} \quad (52)$$

$$w_4^c = \frac{a^c}{\sqrt{\sum_m (a^m)^2}} e^{-j\phi^c} \quad (53)$$

After the coefficient determinator 38 determines the weighting coefficients $w_1^a$ to $w_4^a$, $w_1^b$ to $w_4^b$, and $w_1^c$ to $w_4^c$, the combiner 39 combines, by using the weighting coefficients for each combination as shown in formulas (54) to (57) below, the time series signals being the beat signals whose frequency have been corrected by the frequency correction processors 37a, 37b, and 37c.

[For the Combination of the Frequencies $x^a_{sel1}$, $x^b_{sel1}$, and $x^c_{sel}$]

$$y_1(t) = w_1^a s_{a1}^c(t) + w_1^b s_{b1}^c(t) + w_1^c s_{c1}^c(t) \quad (54)$$

[For the Combination of the Frequencies $x^a_{sel1}$, $x^b_{sel2}$, and $x^c_{sel}$]

$$y_2(t) = w_2^a s_{a1}^c(t) + w_2^b s_{b2}^c(t) + w_2^c s_{c1}^c(t) \quad (55)$$

[For the Combination of the Frequencies $x^a_{sel2}$, $x^b_{sel1}$, and $x^c_{sel}$]

$$y_3(t) = w_3^a s_{a2}^c(t) + w_3^b s_{b3}^c(t) + w_3^c s_{c2}^c(t) \quad (56)$$

[For the Combination of the Frequencies $x^a_{sel2}$, $x^b_{sel2}$, and $x^c_{sel}$]

$$y_4(t) = w_4^a s_{a2}^c(t) + w_4^b s_{b4}^c(t) + w_4^c s_{c2}^c(t) \quad (57)$$

In the foregoing case, four combined signals $y_1(t)$, $y_2(t)$, $y_3(t)$, and $y_4(t)$ are output from the combiner 39 to the object detector 40, and the detection process of the object 2 is performed by the object detector 40 for the four combined signals $y_1(t)$, $y_2(t)$, $y_3(t)$, and $y_4(t)$.

According to Embodiment 2, similarly to Embodiment 1, it is capable of bringing an effect of enhancing the detection probability of the object 2 to be detected without acquiring the position information of the object 2 in advance. In addition, it is possible to reduce the probability of erroneously selecting the noise of the reflected wave as a frequency of a combination target.

Embodiment 3

In the foregoing Embodiment 1, the combination target selector 34 selects a frequency having a relative large spectral component as a frequency of a combination target from among frequencies in the search range. In the foregoing Embodiment 2, the combination target selector 34 selects a frequency having a spectral component larger than a threshold as a frequency of a combination target from among frequencies in the search range.

In Embodiment 3 that will be described hereinafter, a frequency, which has a relative large spectral component and whose spectral component is larger than a threshold, is selected as a frequency of a combination target from among frequencies existing within the search range.

Figure 13:
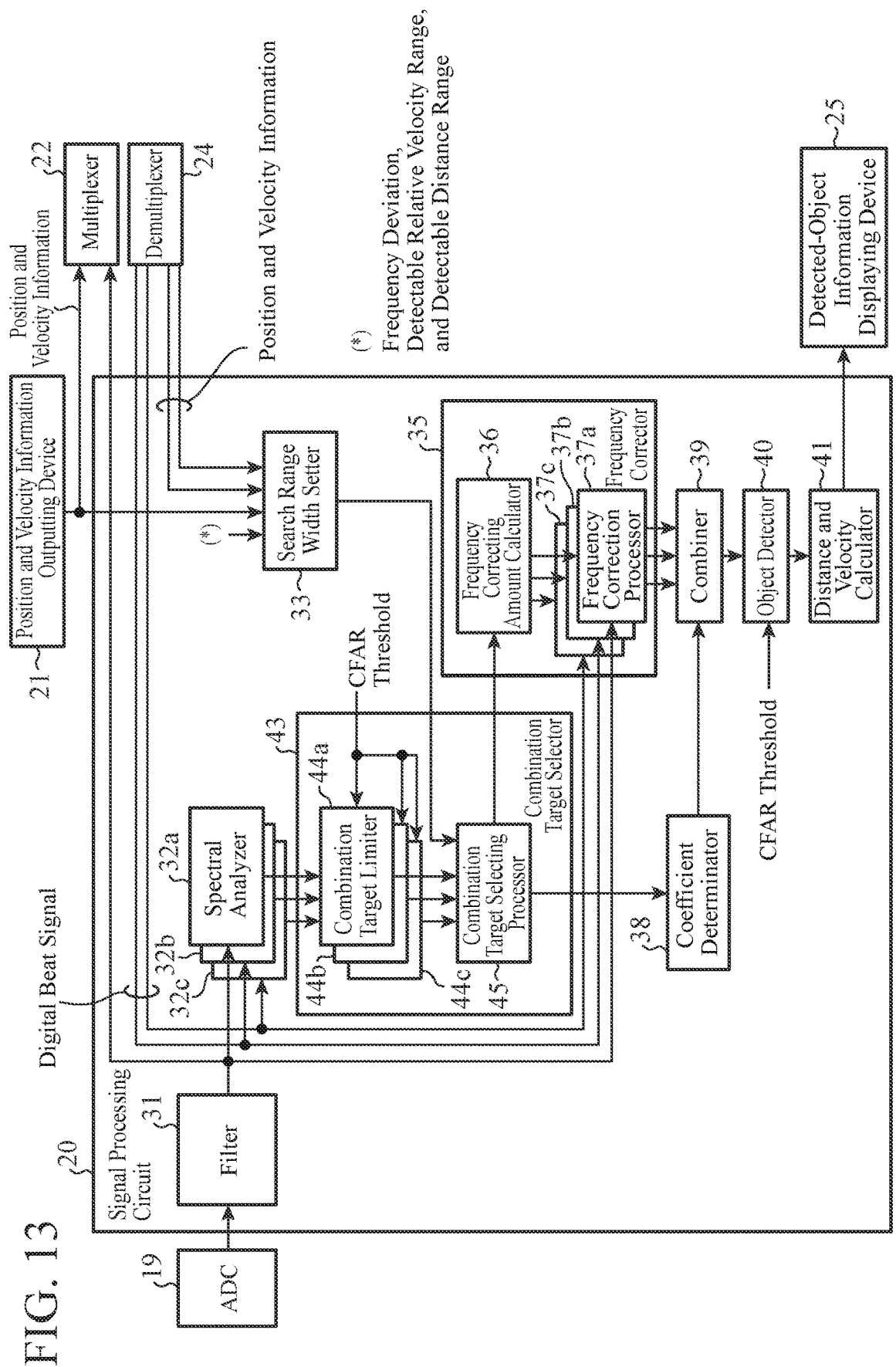
FIG. 13 is a structural diagram illustrating a signal processing circuit 20 of an object detecting device 1 according to Embodiment 3 of the present invention.

FIG. 13 is a structural diagram illustrating a signal processing circuit 20 of an object detecting device 1 according to Embodiment 3 of the present invention, and in the figure, since the same reference numerals as those in FIG. 5 denote the same or corresponding portions, the description thereof will be omitted.

A combination target selector 43 is implemented by the combination target selecting circuit 54 illustrated in FIG. 6, and performs a process of selecting a frequency of a combination target.

A combination target limiter 44a compares spectral components of frequencies in spectra analyzed by the spectral analyzer 32a with the threshold, and performs processing of selecting a frequency whose spectral component is larger than the threshold.

A combination target limiter 44b compares spectral components of frequencies in spectra analyzed by the spectral analyzer 32b with the threshold, and performs processing for selecting a frequency whose spectral component is larger than the threshold.

A combination target limiter 44c compares spectral components of frequencies in spectra analyzed by the spectral analyzer 32c with the threshold, and performs processing for selecting a frequency whose spectral component is larger than the threshold.

A combination target selecting processor 45 selects a frequency having a relative large spectral component from among the frequencies selected by the combination target limiter 44a as a frequency of a combination target, also selects a frequency having a relative large spectral component from among the frequencies selected by the combination target limiter 44b as a frequency of a combination target, and also selects a frequency having a relative large spectral component from among the frequencies selected by the combination target limiter 44c as a frequency of a combination target.

In Embodiment 3, an example will be described, in which the combination target selector 43 is applied to the signal processing circuit 20 in FIG. 5. Alternatively, the combination target selector 43 may be applied to the signal processing circuit 20 in FIG. 12.

Next, the operation will be described.

The combination target limiter 44a sets each frequency of the spectrum relating to the object detecting device 1a analyzed by the spectral analyzer 32a as x, sets the spectral component of the frequency x as $f_b^a(x)$, and calculates each power $pow(f_b^a(x))$ of the spectral component $f_b^a(x)$ of the corresponding frequency x.

The combination target limiter 44b sets each frequency of the spectrum relating to the object detecting device 1b analyzed by the spectral analyzer 32b as x, sets the spectral component of the frequency x as $f_b^b(x)$, and calculates each power $pow(f_b^b(x))$ of the spectral component $f_b^b(x)$ of the corresponding frequency x.

The combination target limiter 44c sets each frequency of the spectrum relating to the object detecting device 1c analyzed by the spectral analyzer 32c as x, sets the spectral component of the frequency x as $f_b^c(x)$, and calculates each power $pow(f_b^c(x))$ of the spectral component $f_b^c(x)$ of the corresponding frequency x.

Subsequently, the combination target limiter 44a compares each power $pow(f_b^a(x))$ of the spectral component $f_b^a(x)$ of the corresponding frequency x with a preset threshold. When there is power $pow(f_b^a(x))$ larger than the threshold among the powers $pow(f_b^a(x))$ of respective frequencies x, the combination target limiter 44a selects a frequency x of the power $pow(f_b^a(x))$.

The combination target limiter 44b compares each power $pow(f_b^b(x))$ of the spectral component $f_b^b(x)$ of the corresponding frequency x with a preset threshold. When there is power $pow(f_b^b(x))$ larger than the threshold among the powers $pow(f_b^b(x))$ of respective frequencies x, the combination target limiter 44b selects a frequency x of the power $pow(f_b^b(x))$.

The combination target limiter 44c compares each power $pow(f_b^c(x))$ of the spectral component $f_b^c(x)$ of the corresponding frequency x with a preset threshold. When there is power $pow(f_b^c(x))$ larger than the threshold among the powers $pow(f_b^c(x))$ of respective frequencies x, the combination target limiter 44c selects a frequency x of the power $pow(f_b^c(x))$.

In the foregoing configuration, the combination target limiters 44a, 44b, and 44c compare the power of the spectral component of each frequency x with the threshold. Alternatively, the amplitude of the spectral component of each frequency x may be compared with the threshold.

After the combination target limiter 44a selects one or more frequencies x, the combination target selecting processor 45 compares powers $pow(f_b^a(x))$ of the respective spectral component $f_b^a(x)$ of one or more frequencies x with each other, and selects a frequency x of the largest power $pow(f_b^a(x))$ as a frequency $x^a_{sel}$ of a combination target.

In addition, after the combination target limiter 44b selects one or more frequencies x, the combination target selecting processor 45 compares powers $pow(f_b^b(x))$ of the respective spectral component $f_b^b(x)$ of one or more frequencies x with each other, and selects a frequency x of the largest power $pow(f_b^b(x))$ as a frequency $x^b_{sel}$ of a combination target.

Further, after the combination target limiter 44c selects one or more frequencies x, the combination target selecting processor 45 compares powers $pow(f_b^c(x))$ of the respective spectral component $f_b^c(x)$ of one or more frequencies x with each other, and selects a frequency x of the largest power $pow(f_b^c(x))$ a frequency $x^c_{sel}$ of a combination target.

According to Embodiment 3, similarly to the foregoing Embodiment 1, there are effects that it is possible to enhance the detection probability of the object 2 to be detected without acquiring the position information of the object 2 in advance, and it is possible to reduce the possibility of erroneously selecting the noise included in the reflected wave as a frequency of a combination target.

In addition, since the number of frequencies of combination targets for each object detecting device 1 is reduced to only one, there is an effect that processing can be reduced in the frequency corrector 35, the coefficient determinator 38, the combiner 39, and the object detector 40 than in the foregoing Embodiment 2.

Note that, in the invention of the present application, within the scope of the invention, free combination of each embodiment, a modification of an arbitrary component of each embodiment, or omission of an arbitrary component in each embodiment is possible.

The object detecting device according to the present invention is suitable for high precision detection of an object existing in a space.

REFERENCE SIGNS LIST

1a, 1b, 1c: Object detecting device; 2: Object to be detected; 3: Object monitor; 11: Transmission signal generating circuit; 12: Transmission high-frequency circuit; 13: Transmission antenna; 14: Beat signal extractor; 15: Reception antenna; 16: Reception high-frequency circuit; 17: Beat signal extracting circuit; 18: Reception signal processor; 19: ADC; 20: Signal processing circuit; 21: Position and velocity information outputting device; 22: Multiplexer; 23: Communication device; 24: Demultiplexer; 25: Detected-object information displaying device; 31: Filter, 32a, 32b, 32c: Spectral analyzer; 33: Search range width setter; 34: Combination target selector; 35: Frequency corrector; 36: Frequency correcting amount calculator; 37a, 37b, 37c: Frequency correction processor; 38: Coefficient determinator; 39: Combiner; 40: Object detector; 41: Distance and velocity calculator; 42: Sample data decimator; 43: Combination target selector; 44a, 44b, 44c: Combination target limiter; 45: Combination target selecting processor; 51: Filter circuit; 52: Spectral analysis circuit; 53: Search range width setting circuit; 54: Combination target selecting circuit; 55: Frequency correcting amount calculating circuit; 56: Frequency correction processing circuit; 57: Coefficient determining circuit; 58: Combining circuit; 59: Object detecting circuit; 60: Distance and velocity calculating circuit; 71: Memory; 72: Processor

The invention claimed is:

1. An object detecting device comprising:
 a beat signal extractor to receive a signal reflecting off an object to be detected and extract a beat signal from the received signal;
 a plurality of spectral analyzers comprising at least one of the plurality of spectral analyzers configured to analyze a spectrum of the beat signal extracted by the beat signal extractor and at least one of the plurality of spectral analyzers configured to analyze a spectrum of a beat signal extracted by another object detecting device;
 a search range width setter to set a search range width for frequency of each beat signal in the beat signals;
 a combination target selector to select a target based on detection of the object by the object detecting devices, the combination target selector configured to
  determine, for each spectrum analyzed by the spectral analyzer in the plurality of spectral analyzers, a frequency search range having the search range width set by the search range width setter, and
  select, for each of the analyzed spectra, a frequency of a combination target from among the frequencies in the determined search range by comparing spectral components of the frequencies in the determined search range; and
 a frequency corrector to
  calculate individual frequency correcting amounts from differences between each of the frequencies of the combination targets selected by the combination target selector, and
  correct a frequency of the beat signal extracted by the beat signal extractor and a frequency of the beat signal extracted by said another object detecting device in accordance with each of the calculated frequency correcting amounts;
 a combiner to combine the beat signals, each of whose frequencies has been corrected by the frequency corrector; and
 an object detector to detect the object from a combined beat signal obtained by the combiner.

2. The object detecting device according to claim 1, further comprising a coefficient determinator to determine weighting coefficients from the spectral components of the frequencies of the combination targets selected by the combination target selector, the weighting coefficients being used for combining the beat signal extracted by the beat signal extractor and the beat signal extracted by said another object detecting device,
 wherein the combiner combines the beat signals, whose frequencies have been corrected by the frequency corrector, by using the weighting coefficients determined by the coefficient determinator.

3. The object detecting device according to claim 1, wherein the search range width setter sets the search range width for frequency on a basis of a distance between the object detecting device and said another object detecting device, velocities of the object detecting device and said another object detecting device, a detectable distance range of the object, a detectable relative velocity range of the object, and a frequency deviation of the device in the object detecting device and said another object detecting device.

4. The object detecting device according to claim 1, wherein the combination target selector determines the frequency search range by comparing spectral components of frequencies in spectra analyzed by the spectral analyzer in the plurality of spectral analyzers and determining a center frequency of the search range width set by the search range width setter.

5. The object detecting device according to claim 1, wherein the combination target selector selects, as the frequency of the combination target, a frequency having a relative large spectral component from among the frequencies in the search range.

6. The object detecting device according to claim 1, wherein the combination target selector selects, as the frequency of the combination target, a frequency having a spectral component larger than a threshold from among the frequencies in the search range.

7. The object detecting device according to claim 1, wherein the combination target selector selects, as the frequency of the combination target, a frequency having a spectral component relative large and larger than a threshold from among the frequencies in the search range.

8. A sensor device comprising:
 an object detecting device that is mounted on the sensor device, wherein the object detecting device includes:
 a beat signal extractor to receive a signal reflecting off an object to be detected and extract a beat signal from the received signal;
 a plurality of spectral analyzers comprising at least one of the plurality of spectral analyzers configured to individually analyze a spectrum of the beat signal extracted by the beat signal extractor and at least one of the plurality of spectral analyzers configured to analyze a spectrum of a beat signal extracted by another object detecting device;
 a search range width setter to set a search range width for frequency of each beat signal in the beat signals;
 a combination target selector to select a target based on detection of the object by the object detecting devices, the combination target selector configured to
  determine, for each spectrum analyzed by the spectral analyzer in the plurality of spectral analyzers, a frequency search range having the search range width set by the search range width setter, and
  select, for each of the analyzed spectra, a frequency of a combination target from among the frequencies in the determined search range by comparing spectral components of the frequencies in the determined search range;
 a frequency corrector to
  calculate individual frequency correcting amounts from differences between each of the frequencies of the combination targets selected by the combination target selector, and
  correct a frequency of the beat signal extracted by the beat signal extractor and a frequency of the beat signal extracted by said another object detecting device in accordance with each of the calculated frequency correcting amounts;
a combiner to combine the beat signals, each of whose frequencies has been corrected by the frequency corrector; and
an object detector to detect the object from a combined beat signal obtained by the combiner.

* * * * *